(12) United States Patent
Rematas et al.

(10) Patent No.: US 12,106,428 B2
(45) Date of Patent: Oct. 1, 2024

(54) RADIANCE FIELDS FOR THREE-DIMENSIONAL RECONSTRUCTION AND NOVEL VIEW SYNTHESIS IN LARGE-SCALE ENVIRONMENTS

(71) Applicant: Google LLC, Mountain View, CA (US)

(72) Inventors: Konstantinos Rematas, Zurich (CH); Thomas Allen Funkhouser, Menlo, CA (US); Vittorio Carlo Ferrari, Zurich (CH); Andrew Huaming Liu, New York, NY (US); Andrea Tagliasacchi, Victoria (CA); Pratul Preeti Srinivasan, San Francisco, CA (US); Jonathan Tilton Barron, Alameda, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/686,683

(22) Filed: Mar. 4, 2022

(65) Prior Publication Data

US 2023/0281913 A1    Sep. 7, 2023

(51) Int. Cl.
*G06T 15/20*    (2011.01)
*G06N 20/00*    (2019.01)
(Continued)

(52) U.S. Cl.
CPC .......... *G06T 15/205* (2013.01); *G06N 20/00* (2019.01); *G06T 5/50* (2013.01); *G06T 5/92* (2024.01); *G06T 17/10* (2013.01)

(58) Field of Classification Search
CPC .......... G06T 15/205; G06T 5/50; G06T 5/92; G06T 17/10; G06T 2207/20081;
(Continued)

(56) References Cited

U.S. PATENT DOCUMENTS 9,836,885 B1 * 12/2017 Eraker .................. G06Q 50/16
2016/0335795 A1 * 11/2016 Flynn .................. G06V 10/764
(Continued)

FOREIGN PATENT DOCUMENTS

| CN | 110969696 A | * | 4/2020 | .......... G06T 3/0018 |
| JP | 6933059 B2 | * | 9/2021 | .......... H04N 23/698 |
| WO | WO2017142130 A1 | * | 6/2017 | .......... H04N 13/204 |

OTHER PUBLICATIONS

Sumantri et al., "360 Panorama Synthesis from a Sparse Set of Images with Unknown Field of View", Mar. 1, 2020; 2020 IEEE Winter Conference on Applications of Computer Vision (WACV), pp. 2375-2384 (Year: 2020).*

(Continued)

*Primary Examiner* — Ryan R Yang
(74) *Attorney, Agent, or Firm* — DORITY & MANNING P.A.

(57) ABSTRACT

Systems and methods for view synthesis and three-dimensional reconstruction can learn an environment by utilizing a plurality of images of an environment and depth data. The use of depth data can be helpful when the quantity of images and different angles may be limited. For example, large outdoor environments can be difficult to learn due to the size, the varying image exposures, and the limited variance in view direction changes. The systems and methods can leverage a plurality of panoramic images and corresponding lidar data to accurately learn a large outdoor environment to then generate view synthesis outputs and three-dimensional reconstruction outputs. Training may include the use of an exposure correction network to address lighting exposure differences between training images.

19 Claims, 12 Drawing Sheets

(51) Int. Cl.
  *G06T 5/50* (2006.01)
  *G06T 5/92* (2024.01)
  *G06T 17/10* (2006.01)

(58) Field of Classification Search
  CPC . G06T 2207/20084; G06T 7/55; G06N 20/00;
              G06N 3/084; G06N 3/045
  See application file for complete search history.

(56) References Cited

U.S. PATENT DOCUMENTS

| | | | |
|---|---|---|---|
| 2020/0242771 A1* | 7/2020 | Park | G06T 11/001 |
| 2021/0004933 A1* | 1/2021 | Wong | G06T 7/30 |
| 2023/0206402 A1* | 6/2023 | Liu | G06T 5/002 |
| | | | 382/103 |

OTHER PUBLICATIONS

Agarwal et al, Building rome in a day. Communications of the ACM, vol. 54, No. 10, Oct. 2011, pp. 105-112.
Azinovic et al, "Neural RGB-D Surface Reconstruction", Conference on Computer Vision and Pattern Recognition, Jun. 19-24, 2022, New Orleans, Louisiana, United States, pp. 6290-6301.
Barron et al, "Mip-NeRF: A Multiscale Representation for Anti-Aliasing Neural Radiance Fields", International Conference on Computer Vision, Oct. 11-17, 2021, Virtual, 19 pages.
Ben Mildenhall et al, "NeRF: Representing Scenes as Neural Radiance Fields for View Synthesis", arXiv:2003.08934v2, Aug. 3, 2020, 25 pages.
Caesar et al, "nuScenes: A Multimodal Dataset for Autonomous Driving", arXiv:1903.11027v5, May 5, 2020, 16 pages.
Chang et al, "Argoverse: 3D Tracking and Forecasting with Rich Maps", arXiv:1911.02620v1, Nov. 6, 2019, 18 pages.
Chen et al, "Encoder-Decoder with Atrous Separable Convolution for Semantic Image Segmentation", arXiv:1802.02611v3, Aug. 22, 2018, 18 pages.
Chen et al, "MVSNeRF: Fast Generalizable Radiance Field Reconstruction From Multi-View Stereo", International Conference on Computer Vision, Oct. 11-17, 2021, Virtual, 13 pages.
Chen Gao et al, "Dynamic View Synthesis from Dynamic Monocular Video", arXiv:2105.06468v1, May 13, 2021, 11 pages.
Chibane et al, "Stereo Radiance Fields (SRF): Learning View Synthesis for Sparse Views of Novel Scenes", arXiv:210406935v1, Apr. 14, 2021, 10 pages.
Curless et al, "A Volumetric Method for Building Complex Models from Range Images", Conference on Computer Graphics and Interactive Techniques, Aug. 4-9, 1996, New Orleans, Louisiana, United States, 10 pages.
Dai et al, "ScanNet: Richly-Annotated 3D Reconstructions of Indoor Scenes", arXiv:1702.04405v2, Apr. 11. 2017, 22 pages.
Debevec et al, "Modeling and Rendering Architecture from Photographs: A Hybrid Geometry- and Image-Based Approach", Conference on Computer Graphics and Interactive Techniques, Aug. 4-9, 1996, New Orleans, Louisiana, United States, 10 pages.
Dellaert et al, "Neural Volume Rendering: NeRF and Beyond", arXiv:2101.05204v2, Jan. 14, 2021, 8 pages.
Deng et al, "Depth-Supervised Nerf: Fewer Views and Faster Training for Free", arXiv:2107.02791v2, Apr. 29, 2022, 13 pages.
Dessein et al, "Seamless Texture Stitching on a 3D Mesh by Poisson Blending in Patches", International Conference on Image Processing, Oct. 27-30, 2014, Paris, France, 5 pages.
Geiger et al, "Are We Ready for Autonomous Driving? The KITTI Vision Benchmark Suite", Conference on Computer Vision and Pattern Recognition, Jun. 16-21, 2012, Providence, Rhode Island, United States, 8 pages.
Geiger et al, "Vision Meets Robotics: The KITTI Dataset", The International Journal of Robotics Research, 2013, 6 pages.
Geyer et al, "A2D2: Audi Autonomous Driving Dataset", arXiv:2004.06320v1, Apr. 14, 2020, 10 pages.

Github, "JAX: Composable Transformations of Python+NumPy Programs", https://github.com/google/jax, retrieved on Aug. 11, 2022, 13 pages.
Google Maps, Street View, www.google.com/streetview/, retrieved on Aug. 11, 2022, 8 pages.
Hao et al, "GANcraft: Unsupervised 3D Neural Rendering of Minecraft Worlds", arXiv:2104.07659v1, Apr. 15, 2021, 16 pages.
Huang et al, "The ApolloScape Dataset for Autonomous Driving", Conference on Computer Vision and Pattern Recognition, Jun. 18-22, 2018, Salt Lake City, pp. 1067-1073.
Hugging Face, "JaxNeRF: an Efficient JAX Implementation of NeRF", https://huggingface.co/spaces/flax-community/DietNerf-Demo/blame/39dcc541bfe2adfb1adfc6901570d59feee8a224/jaxnerf/README.md, retrieved on Aug. 11, 2022, 6 pages.
Ilci et al, "High Definition 3D Map Creation using GNSS/IMU/LiDAR Sensor Integration to Support Autonomous Vehicle Navigation", Sensors, vol. 20, 2020, 17 pages.
Izadi et al, "KinectFusion: Real-Time 3D Reconstruction and Interaction using a Moving Depth Camera", Symposium on User Interface Software and Technology, Oct. 16-19, 2011, Santa Barbara, California, 10 pages.
Jang et al, "CodeNeRF: Disentangled Neural Radiance Fields for Object Categories", International Conference on Computer Vision, Oct. 12-15, 2021, Virtual, 10 pages.
Justraub et al, "The Replica Dataset; A Digital Replica of Indoor Spaces", arXiv:1906.05797v1, Jun. 13, 2019, 10 pages.
Kazhdan et al, "Poisson Surface Reconstruction", Symposium on Geometry Processing, Jun. 26-28, 2006, Sardinia, Italy, 10 pages.
Knapitsch et al, "Tanks and Temples: Benchmarking Large-Scale Scene Reconstruction", Transactions on Graphics, 2017, 43 pages.
Li et al, "MINE: Towards Continuous Depth MPI with NeRF for Novel View Synthesis", arXiv:2103.14910v3, Jul. 30, 2021, 16 pages.
Liao et al, "KITTI-360: A Novel Dataset and Benchmarks for Urban Scene Understanding in 2D and 3D", arXiv:2109.13410v2, Jun. 3, 2022, 32 pages.
Lin et al, "BARF: Bundle-Adjusting Neural Radiance Fields", arXiv:2104.06405v2, Aug. 19, 2021, 15 pages.
Liu et al, "Neural Sparse Voxel Fields", arXiv:2007.11571v2, Jan. 6, 2021, 22 pages.
Lyft Level 5 Perception Dataset, https://level-5.global/data/perception/, retrieved on Aug. 11, 2022.
Martin-Brualla et al, "NeRF in the Wild: Neural Radiance Fields for Unconstrained Photo Collections", arXiv:2008.02268v3, Jan. 6, 2021, 15 pages.
Matusik et al, "Image-Based Visual Hulls", Conference on Computer Graphics and Interactive Techniques, Jul. 23-18, 2000, New Orleans, Louisiana, United States. pp. 369-374.
Mildenhall et al, "Local Light Field Fusion: Practical View Synthesis with Prescriptive Sampling Guidelines", arXiv:1905.00889v1, May 2, 2019, 14 pages.
Musialski et al, "A Survey of Urban Reconstruction", Computer graphics forum, 2013, 26 pages.
Oechsle et al, "UNISURF: Unifying Neural Implicit Surfaces and Radiance Fields for Multi-View Reconstruction", arXiv:2104.10078v2, Oct. 8, 2021, 11 pages.
Ost et al, "Scene Graphs for Dynamic Scenes", arXiv:2011.10379v3, Mar. 5, 2021, 11 pages.
Park et al, "DeepSDF: Learning Continuous Signed Distance Functions for Shape Representation", arXiv:1901.05103v1, Jan. 16, 2019, 19 pages.
Reizenstein et al, "Common Objects in 3D: Large-Scale Learning and Evaluation of Real-Life 3D Category Reconstruction", International Conference on Computer Vision Oct. 11-17, 2021, Virtual pp. 10901-10911.
Rematas et al, "ShaRF: Shape-Conditioned Radiance Fields from a Single View", arXiv:2102.08860v2, Jun. 23, 2021, 11 pages.
Romanoni et al, "Mesh-Based 3D Textured Urban Mapping", arXiv:1708.05543v1, Aug. 18, 2017, 7 pages.
Ruckert et al, ADOP: Approximate Differentiable One-Pixel Point Rendering. arXiv:2110.06635v3, May 3, 2022, 14 pages.

(56) References Cited

OTHER PUBLICATIONS

Schonberger et al, "Pixelwise View Selection for Unstructured Multi-View Stereo", European Conference on Computer Vision, Oct. 8-16, 2016, Amsterdam, The Netherlands, 17 pages.
Shim et al, "3d Mapping in Urban Environment using Geometric Featured Voxel", International Conference on Ubiquitous Robots and Ambient Intelligence, Nov. 23-26, 2011, Incheon, Korea, 2 pages.
Sitzmann et al, "Scene Representation Networks: Continuous 3D-Structure-Aware Neural Scene Representations", Conference on Neural Information Processing Systems, Dec. 8-14, 2019, Vancouver, Canada, 12 pages.
Snavely et al, "Photo Tourism: Exploring Photo Collections", Transactions on Graphics, 2006, 12 pages.
Srinivasan et al, "Pushing the Boundaries of View Extrapolation with Multiplane Images", arXiv:1905.00413v1, May 1, 2019, 12 pages.
Sucar et al, "iMAP: Implicit Mapping and Positioning in Real-Time", International Conference on Computer Vision, Oct. 11-17, 2021, Virtual, pp. 6229-6238.
Sun et al, "Scalability in Perception for Autonomous Driving", arXiv:1912.04838v7, May 12, 2020, 9 pages.
Tong et al, "CSPC-Dataset: New Lidar Point Cloud Dataset and Benchmark for Large-Scale Scene Semantic Segmentation", Access, vol. 8, 2020, pp. 87695-87718.
Trevithick et al, "GRF: Learning a General Radiance Field for 3D Scene Representation and Rendering", arXiv:2010.04595v3, Aug. 11, 2021, 20 pages.
Truong-Hong et al, "Octree-Based, Automatic Building Facade Generation from LiDAR Data", Computer-Aided Design, Aug. 2014, 38 pages.
Wang et al, "NeRF—: Neural Radiance Fields Without Known Camera Parameters", arXiv:2102.07064v4, Apr. 6, 2022, 17 pages.
Wang et al, "NeuS: Learning Neural Implicit Surfaces by Volume Rendering for Multi-View Reconstruction", arXiv:2106.10689v2, Dec. 16, 2021, 23 pages.
Yang, "Learning Object-Compositional Neural Radiance Field for Editable Scene Rendering", arXiv:2109.01847v1, Sep. 4, 2021, 10 pages.
Yariv et al, "Multiview Neural Surface Reconstruction by Disentangling Geometry and Appearance", arXiv:2003.09852v3, Oct. 25, 2020, 18 pages.
Yariv et al, "Volume Rendering of Neural Implicit Surfaces", arXiv:2106.12052v2, Dec. 1, 2021, 19 pages.
Yi Wei, "NerfingMVS: Guided Optimization of Neural Radiance Fields for Indoor Multi-View Stereo", arXiv:2109.01129V1, Sep. 2, 2021, 11 pages.
Yu et al, "Neural Radiance Fields from One or Few Images", arXiv:2012.02190v3, May 30, 2021, 20 pages.
Zhang et al, "NeRF++: Analyzing and Improving Neural Radiance Fields", arXiv:2010.07492v2, Oct. 21, 2020, 9 pages.
Zhang et al, "The Unreasonable Effectiveness of Deep Features as a Perceptual Metric", arXiv:1801.03924v2, Apr. 10, 2018, 14 pages.
Zhi et al, "In-Place Scene Labelling and Understanding with Implicit Scene Representation", arXiv:2103.15875v2, Aug. 21, 2021, 14 pages.
Zhou et al, "Stereo Magnification: Learning View Synthesis using Multiplane Images", arXiv:1805.09817v1, May 24, 2018, 12 pages.
Barron et al., "Mip-NeRF: A Multiscale Representation for Anti-Aliasing Neural Radiance Fields", arXiv:2103.13415v3, Aug. 14, 2021.
Chibane et al., "Stereo Radiance Fields (SRF): Learning View Synthesis for Sparse Views of Novel Scenes", arXiv:2104.06935vl, Apr. 14, 2021, 10 pages.
Jain et al., "Putting NeRF on a Diet: Semantically Consistent Few-Shot View Synthesis", arXiv:2104.00677v1, Apr. 1, 2021, 15 pages.
Kangle Deng et al., "Depth-supervised NeRF: Fewer Views and Faster Training for Free", arXiv:2107.02791v2, Apr. 29, 2022, 13 pages.
Mildenhall et al., NeRF: Representing Scenes as Neural Radiance Fields for View Synthesis, arXiv:2003.08934v2, 25 pages.
Wang et al., "IBRNet: Learning Multi-View Image-Based Rendering", arXiv:2102.13090v2, Apr. 6, 2021, 15 pages.
Yu et al., "pixelNeRF: Neural Radiance Fields from One or Few Images", arXiv:2012.02190v3, May 30, 2021, 20 pages.

* cited by examiner

RADIANCE FIELDS FOR THREE-DIMENSIONAL RECONSTRUCTION AND NOVEL VIEW SYNTHESIS IN LARGE-SCALE ENVIRONMENTS

FIELD

The present disclosure relates generally to the generation of view synthesis renderings and/or three-dimensional reconstructions with a machine-learned model. More particularly, the present disclosure relates to the generation of view synthesis renderings and/or three-dimensional reconstructions with a machine-learned view synthesis model trained with depth data and image data.

BACKGROUND

View synthesis for outside environments can be difficult as lighting and scale can cause difficulties in learning an environment. Specifically, the collection of training images for learning an outdoor environment can be time consuming and costly due to the sheer scale of what is being modeled. Additionally, the collection of outdoor images can lead to a large variance in colors being learned for an object that may be a singular color. The color issued can be caused by various lighting differences based on angles, times of day, etc. Therefore, a novel view synthesis may depict an object in the environment as multi-colored despite the object being a solid color.

Scale can be of issue when considering the determined density value of the sky and/or other undetermined depth objects due to a depth being several magnitudes further away that the foreground objects. For larger urban environments in particular, the training of the model using traditional systems can require time-intensive and costly collection of training data including three-dimensional positions, two-dimensional view directions, and images for miles of buildings, roads, structures, and landscapes.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining input data. The input data can be descriptive of a three-dimensional position and a two-dimensional view direction. The operations can include processing the input data with a machine-learned view synthesis model to generate a view synthesis output. In some implementations, the machine-learned view synthesis model can be trained with a plurality of panoramic images and lidar data, and the plurality of panoramic images can be descriptive of an environment. The operations can include providing the view synthesis output as an output. The view synthesis output can include a novel view synthesis that differs from the plurality of panoramic images.

In some implementations, the machine-learned view synthesis model can include an exposure correction network, and the exposure correction network can compensate for different exposures of different cameras utilized to generate the plurality of panoramic images. The plurality of panoramic images can be obtained from a mapping platform, and the plurality of panoramic images can include a plurality of street-view images. In some implementations, the machine-learned view synthesis model can include a first model to determine foreground color values and foreground opacity values for foreground features and a second model to determine background color values and background opacity values. The machine-learned view synthesis model can be trained to learn a three-dimensional reconstruction of the environment. In some implementations, the view synthesis output can include a three-dimensional reconstruction output. The view synthesis output can be descriptive of at least a portion of the environment, and the environment can include an urban outdoor environment. In some implementations, the machine-learned view synthesis model can include a neural radiance field model. The plurality of panoramic images can be processed with a pre-trained semantic segmentation model before training the machine-learned view synthesis model. In some implementations, the pre-trained semantic segmentation model can determine one or more pixels are associated with a sky in the environment and masks the one or more pixels.

Another example aspect of the present disclosure is directed to a computer-implemented method. The method can include obtaining, by a computing system including one or more processors, input data. The input data can be descriptive of a three-dimensional position and a two-dimensional view direction. The method can include processing, by the computing system, the input data with a machine-learned view synthesis model to generate a view synthesis output. In some implementations, the machine-learned view synthesis model can be trained with a plurality of images and lidar data, and the plurality of images can be descriptive of an environment. The machine-learned view synthesis model can include a first model for determining foreground values and a second model for determining background values associated with a background in the environment with an undetermined depth. The method can include providing, by the computing system, the view synthesis output for display. The view synthesis output can include a novel view synthesis of the environment.

In some implementations, the plurality of images can include image data generated by one or more cameras with a fisheye lens. The second model can include a spherical radiance map for determining a direction-based color value for the background. In some implementations, the second model can be trained at least in part one or more augmented images generated with a pre-trained semantic segmentation model.

Another example aspect of the present disclosure is directed to one or more non-transitory computer-readable media that collectively store instructions that, when executed by one or more computing devices, cause the one or more computing devices to perform operations. The operations can include obtaining training data. In some implementations, the training data can include a plurality of training positions, a plurality of training view directions, a plurality of training images, and lidar data. The operations can include processing the plurality of training images with a pre-trained semantic segmentation model to generate a plurality of augmented images. In some implementations, the pre-trained semantic segmentation model can be trained to remove occlusions from images. The operations can include processing a position and a view direction with a view synthesis model to generate a predicted view synthesis output. The predicted view synthesis output can include one or more predicted color values and one or more predicted opacity values. The operations can include evaluating a loss function that evaluates a difference between the predicted view synthesis output and at least one of one or more of the plurality of augmented images or one or more points of the lidar data and adjusting one or more parameters of the view synthesis model based at least in part on the loss function.

In some implementations, the loss function can include a photometric-based loss that evaluates a difference between the predicted view synthesis output and one or more of the plurality of augmented images. The loss function can include a lidar loss that evaluates a difference between the predicted view synthesis output and one or more points of the lidar data. In some implementations, the loss function can evaluate the predicted view synthesis output based at least in part on one or more expected depth values or a determined line-of-sight, the one or more expected depth values can be determined based at least in part on the lidar data, and the determined line-of-sight can be associated with a radiance being concentrated at a single point along a ray. In some implementations, the loss function can include a penalization term for non-zero density values outside of a determined high density area associated with a surface. The loss function can include a penalization term for non-zero density values associated with a ray directed towards a determined sky area.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
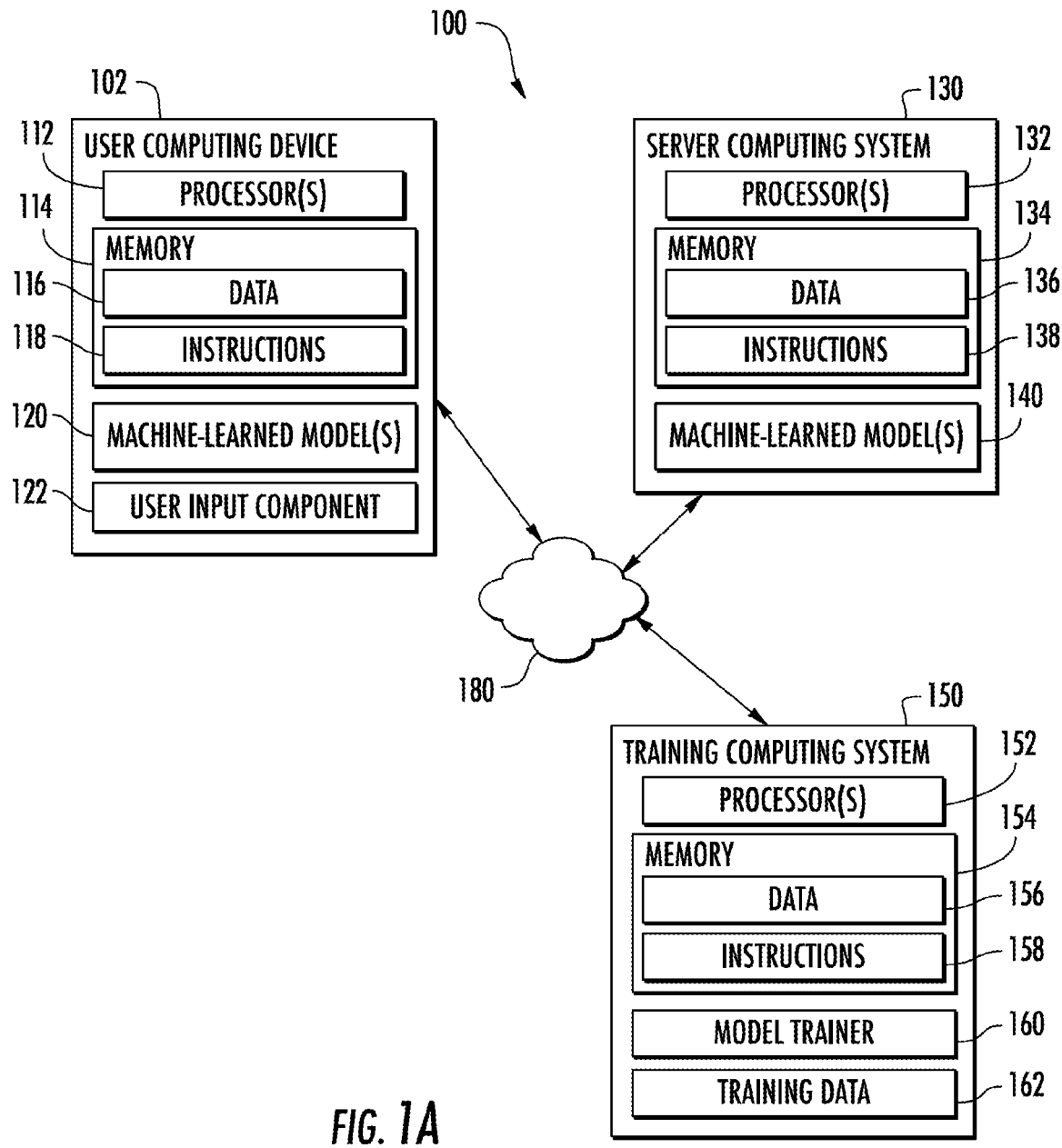
FIG. 1A depicts a block diagram of an example computing system that performs view synthesis rendering according to example embodiments of the present disclosure.

Reference numerals that are repeated across plural figures are intended to identify the same features in various implementations.

DETAILED DESCRIPTION

Overview

Generally, the present disclosure is directed to systems and methods for three-dimensional reconstruction and novel view synthesis. For example, the systems and methods disclosed herein can generate three-dimensional reconstructions and novel view synthesis outputs by leveraging one or more machine-learned view synthesis models trained on a plurality of images and lidar data. The systems and methods can include obtaining input data. The input data can be descriptive of a three-dimensional position and a two-dimensional view direction. In some implementations, the three-dimensional position can be associated with a location in an environment, and the two-dimensional view direction can be associated with a directional view in the environment. The input data can be processed with a machine-learned view synthesis model to generate a view synthesis output. The machine-learned view synthesis model can be trained with a plurality of images and lidar data. In some implementations, the plurality of images can be descriptive of an environment. The plurality of images can include a plurality of panoramic images. Alternatively and/or additionally, the plurality of images can include a plurality of images captured by one or more cameras with a fisheye lens. The systems and methods can include providing the view synthesis output for display. In some implementations, the view synthesis output can include a novel view synthesis that differs from the plurality of images. Alternatively and/or additionally, the machine-learned view synthesis model may generate a three-dimensional reconstruction output descriptive of the environment.

In some implementations, the systems and methods can include the use of an exposure correction network to compensate for the different exposures of the cameras utilized to obtain the plurality of images. Additionally and/or alternatively, the systems and methods can include the use of semantic segmentation to find the pixels that correspond to the sky, which can allow the machine-learned view synthesis model to model the color of these pixels with a separate network than the sub-model utilized for foreground synthesis. In some implementations, the machine-learned view synthesis model can be trained by utilizing a combination of red-green-blue losses and lidar losses for training a radiance field that is geometry aware.

The systems and methods disclosed herein can include obtaining input data. The input data can be descriptive of a three-dimensional position and/or a two-dimensional view direction. The input data can be processed with a machine-learned view synthesis model to generate a view synthesis output. In some implementations, the machine-learned view synthesis model can be trained with a plurality of panoramic images and lidar data. The plurality of panoramic images can be descriptive of an environment. The view synthesis output can be provided as an output and/or for display. The view synthesis output can include a novel view synthesis that differs from the plurality of panoramic images.

In some implementations, the systems and methods can obtain input data. The input data can be descriptive of a three-dimensional position and a two-dimensional view direction. The three-dimensional position can be associated with a location in an environment. In some implementations, the environment can include one or more structures. The one or more structures can include buildings, bridges, roads, light posts, barriers, mailboxes, etc. In some implementations, the environment can include trees, bushes, grass, other plants, dirt, rocks, boulders, etc. The environment can include an outdoor urban environment associated with a city.

The input data can be processed with a machine-learned view synthesis model to generate a view synthesis output. In some implementations, the machine-learned view synthesis model can be trained with a plurality of panoramic images and depth data (e.g., lidar data). The plurality of panoramic images can be descriptive of an environment. The plurality of panoramic images can be captured by one or more cameras. In some implementations, the one or more cameras can include fisheye lenses. Additionally and/or alternatively, the depth data can be obtained via radar, a light detection and ranging (lidar) sensor, a range finder, etc.

In some implementations, the plurality of images can be descriptive of an environment. For example, the plurality of images can include images depicting a same, or similar, scene of the environment captured from different positions and angles.

Additionally and/or alternatively, the machine-learned view synthesis model can include a first model for determining foreground values and a second model for determining background values associated with a background in the environment with an undetermined depth. In some implementations, the second model can be trained at least in part one or more augmented images generated with a pre-trained semantic segmentation model.

Additionally and/or alternatively, the plurality of panoramic images can be obtained from a mapping platform. In some implementations, the plurality of panoramic images can include a plurality of street-view images. The plurality of images can include image data generated by one or more cameras with a fisheye lens.

In some implementations, the plurality of panoramic images can be processed with a pre-trained semantic segmentation model before training the machine-learned view synthesis model. The pre-trained semantic segmentation model can determine one or more pixels are associated with a sky in the environment and masks the one or more pixels. In some implementations, the machine-learned view synthesis model can include a neural radiance field model.

Additionally and/or alternatively, the machine-learned view synthesis model can include an exposure correction network. The exposure correction network can compensate for different exposures of different cameras utilized to generate the plurality of panoramic images. The different exposures can be caused by different lighting for different images capturing the environment. The different lighting can be due to different times of day, different angles being captured with different shadows, varying weather, etc.

In some implementations, the machine-learned view synthesis model can include a first model to determine foreground color values and foreground opacity values for foreground features and a second model to determine background color values and background opacity values. The second model can include a spherical radiance map for determining a direction-based color value for the background.

Additionally and/or alternatively, the machine-learned view synthesis model can be trained to learn a three-dimensional reconstruction of the environment. The view synthesis output can include a three-dimensional reconstruction output.

The view synthesis output can be provided for display. The view synthesis output can include a novel view synthesis that differs from the plurality of panoramic images. In some implementations, the view synthesis output can include a novel view synthesis of the environment. The view synthesis output can be descriptive of at least a portion of the environment. In some implementations, the environment can include an urban outdoor environment.

The systems and methods can include training the machine-learned view synthesis model with a training dataset. For example, the systems and methods can include obtaining training data. The training data can include a plurality of training positions, a plurality of training view directions, a plurality of training images, and/or lidar data. The plurality of training images can be processed with a pre-trained semantic segmentation model to generate a plurality of augmented images. In some implementations, the pre-trained semantic segmentation model may be trained to remove occlusions from images. A position and/or a view direction can be processed with a view synthesis model to generate a predicted view synthesis output. The predicted view synthesis output can include one or more predicted color values and/or one or more predicted opacity values. In some implementations, the systems and methods can include evaluating a loss function that evaluates a difference between the predicted view synthesis output and at least one of one or more of the plurality of augmented images or one or more points of the lidar data. The systems and methods can include adjusting one or more parameters of the view synthesis model based at least in part on the loss function.

The systems and methods for training the view synthesis model can include obtaining training data. The training data can include a plurality of training positions, a plurality of training view directions, a plurality of training images, and/or depth data (e.g., lidar data). The plurality of training images can include a plurality of panoramic images. The plurality of panoramic images can be descriptive of street view image data collected for street view mapping purposes. The depth data can be similarly obtained from a database associated with a mapping application. The depth data can include lidar data generated by a light detection and ranging (lidar) sensor. The plurality of training images and the depth data may have been generated at similar times via sensors attached to a vehicle or other mobile object (e.g., a person carrying a camera rig with a lidar sensor placed on a backpack while walking through a city).

In some implementations, the plurality of training images can be processed with a pre-trained semantic segmentation model to generate a plurality of augmented images. The augmented images can be descriptive of the environment with occlusions removed. The pre-trained semantic segmentation model can be trained to remove occlusions from images (e.g., people, moving objects, or other objects that do not contribute to the environment in a permanent to a semi-permanent sense).

A position (e.g., a three-dimensional position in an environment) and a view direction (e.g., a two-dimensional view direction associated with an environment) can be processed with a view synthesis model to generate a predicted view synthesis output. In some implementations, the predicted view synthesis output can include one or more predicted color values (e.g., a probability value associated with the likelihood a certain position in a rendering should be a particular color) and one or more predicted opacity values (e.g., a probability value associated with the density of occupancy at given positions in a rendering).

The systems and methods can include evaluating a loss function that evaluates a difference between the predicted view synthesis output and at least one of one or more of the plurality of augmented images or one or more points of the lidar data (e.g., one or more points associated with three-dimensional point cloud data). In some implementations, the loss function can include a photometric-based loss (e.g., a red-green-blue loss) that evaluates a difference between the predicted view synthesis output and one or more of the plurality of augmented images. Additionally and/or alternatively, the loss function can include a lidar loss that evaluates a difference between the predicted view synthesis output and one or more points of the lidar data.

In some implementations, the loss function can include a penalization term for non-zero density values outside of a determined high density area associated with a surface. The loss function can include a penalization term for non-zero density values associated with a ray directed towards a determined sky area.

The systems and methods can include adjusting one or more parameters of the view synthesis model based at least in part on the loss function. In some implementations, the loss function can evaluate the predicted view synthesis output based at least in part on one or more expected depth values or a determined line-of-sight. The one or more expected depth values can be determined based at least in part on the lidar data. The determined line-of-sight can be associated with a radiance being concentrated at a single point along a ray.

The systems and methods of the present disclosure provide a number of technical effects and benefits. As one example, the system and methods can train a view synthesis model. More specifically, the systems and methods disclosed herein can leverage street view data to train a view synthesis model to generate novel view synthesis renderings and three-dimensional reconstructions of an outdoor urban environment. The street view data can include street view images (e.g., panoramic images captured from a street or sidewalk perspective) and depth data (e.g., lidar data which can include three-dimensional point cloud data). The data can be pre-existing data collected by one or more map companies that collected the data for a map application. The images may be processed to remove moving objects, or occlusions, to correct exposure issues between images, and to segment the sky. The processing can allow the systems and methods to leverage the images for training the model to produce more accurate outputs with more uniform coloring. The images and the depth data can be utilized to evaluate multiple losses to ensure the predicted colors and densities are accurate to the ground truth and to real world geometry.

Another technical benefit of the systems and methods of the present disclosure is the ability to model large environments. More specifically, the systems and methods can train a view synthesis model to generate novel view synthesis renderings and/or three-dimensional reconstructions of large environments. The novel view synthesis renderings can include color predictions that may be more uniformly adjusted to provide more accurate contrast between colors despite varying light exposures between different training images. Additionally and/or alternatively, the use of depth data (e.g., lidar data) can allow for more accurate training for learning depths in large scale environments.

Another example technical effect and benefit relates to the reduction of computational cost and computational time. The systems and methods disclosed herein can allow for the training of view synthesis models for rendering outputs for large environments using pre-existing data collected for mapping purposes. In particular, the use of depth data in combination with the street view images can allow for learning a large environment without the need to collect new images and can allow for training using less images as the depth data losses can allow for accurate density predictions with less image data. Therefore, by performing training with fewer images, the number of training cycles overall can be reduced, thereby conserving computational resources such as processor usage, memory usage, network bandwidth usage, etc.

With reference now to the Figures, example embodiments of the present disclosure will be discussed in further detail.

Example Devices and Systems

FIG. 1A depicts a block diagram of an example computing system 100 that performs view synthesis and three-dimensional reconstruction according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more view synthesis models 120. For example, the view synthesis models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example view synthesis models 120 are discussed with reference to FIGS. 2, 4, & 10.

In some implementations, the one or more view synthesis models 120 can be received from the server computing system 130 over network 180, stored in the user computing device memory 114, and then used or otherwise implemented by the one or more processors 112. In some implementations, the user computing device 102 can implement multiple parallel instances of a single view synthesis model 120 (e.g., to perform parallel view synthesis rendering across multiple instances of input data).

More particularly, the view synthesis model can be trained using a plurality of images and depth data. Once the view synthesis model is trained, the machine-learned view synthesis model can obtain a position and a view direction and output a view synthesis output and/or a three-dimensional reconstruction output.

Additionally or alternatively, one or more view synthesis models 140 can be included in or otherwise stored and implemented by the server computing system 130 that communicates with the user computing device 102 according to a client-server relationship. For example, the view synthesis models 140 can be implemented by the server computing system 140 as a portion of a web service (e.g., a view synthesis/three-dimensional reconstruction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned view synthesis models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2, 4, & 10.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the view synthesis models 120 and/or 140 based on a set of training data 162. The training data 162 can include, for example, a plurality of images (e.g., a plurality of panoramic images obtained from a map service database) and depth data (e.g., lidar data obtained from a map service database).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data (e.g., input text descriptive of a position and view direction). The machine-learned model(s) can process the text or natural language data to generate an output. As another example, the machine-learned model(s) can process the text or natural language data to generate a classification output. As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
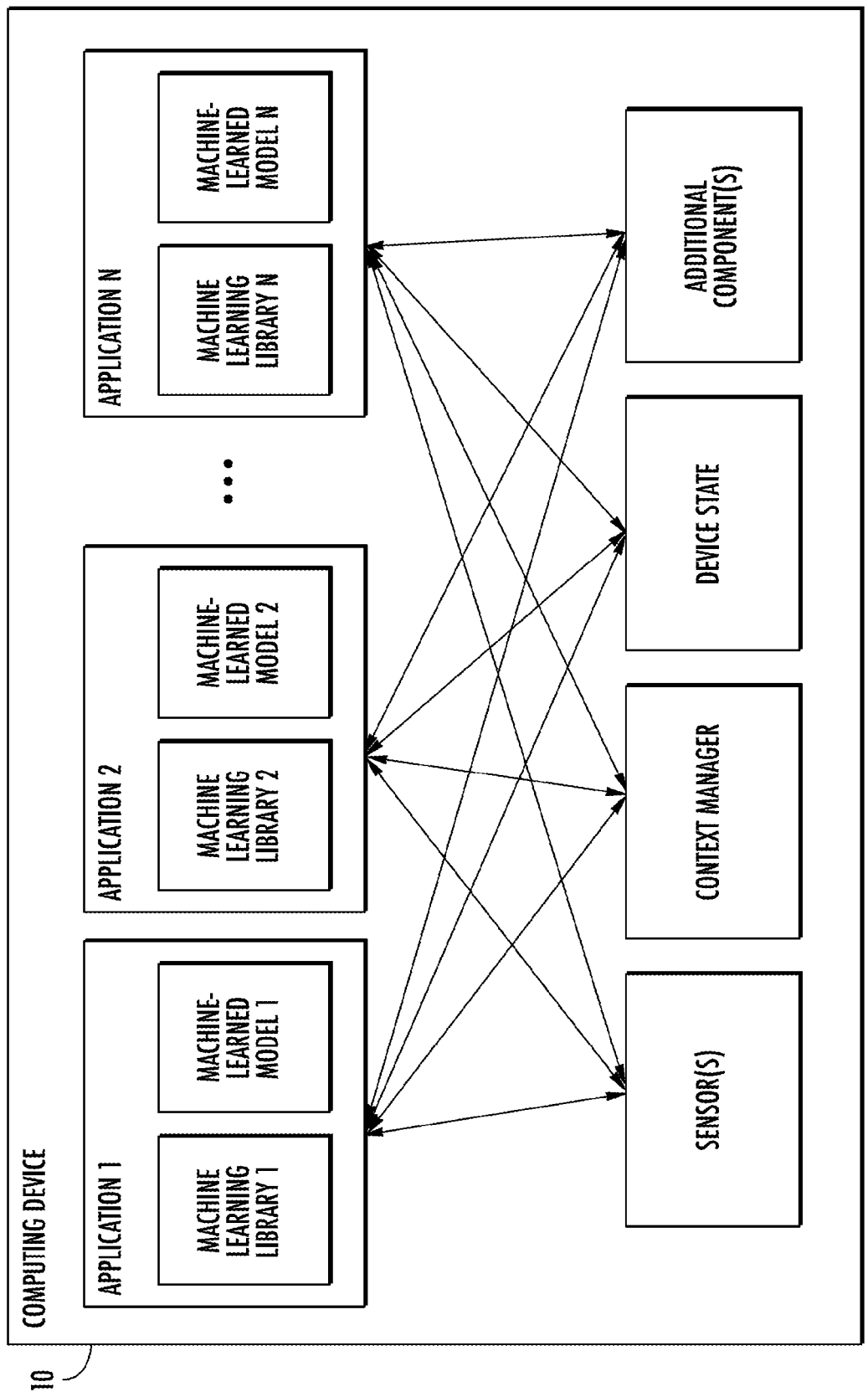
FIG. 1B depicts a block diagram of an example computing device that performs view synthesis rendering according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
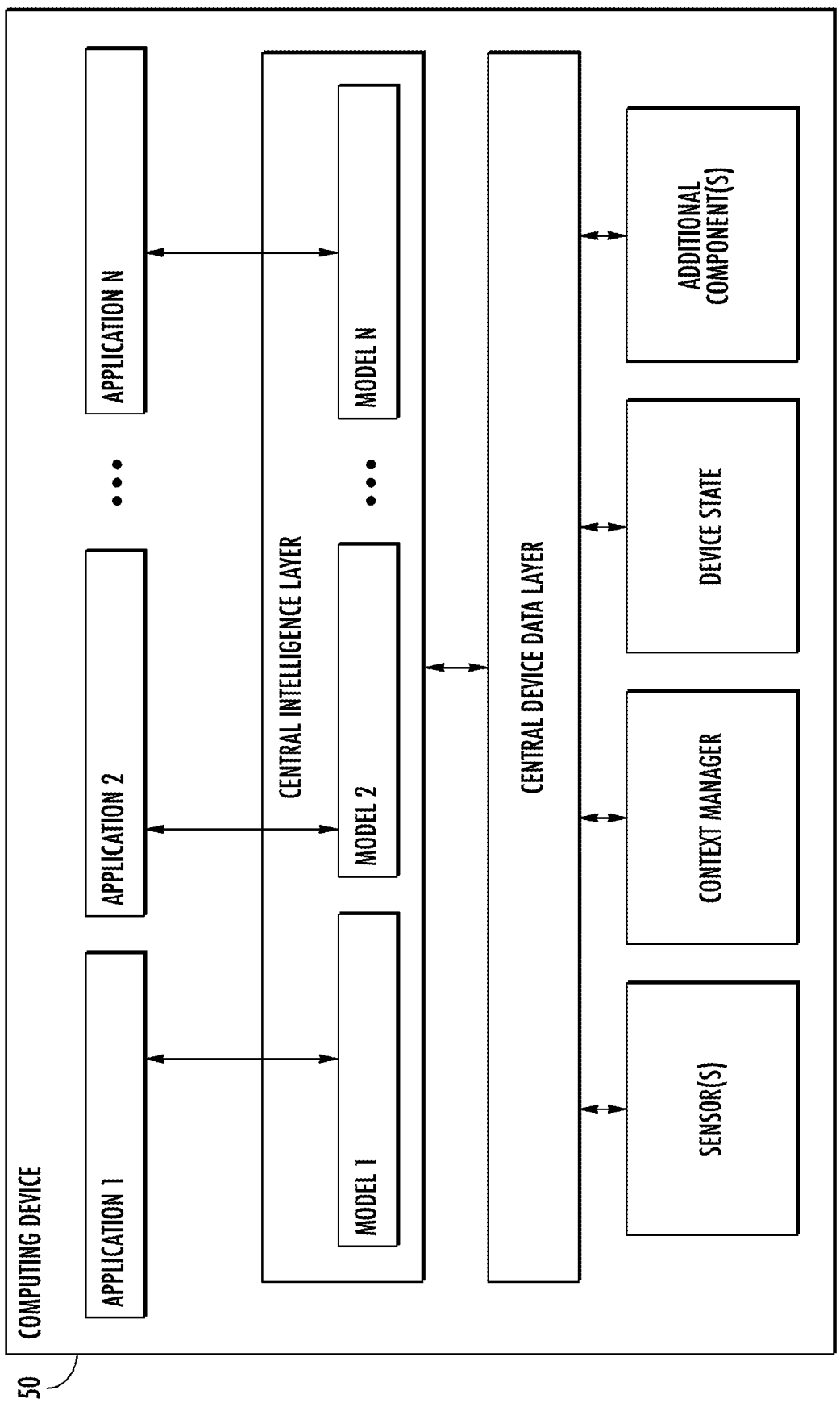
FIG. 1C depicts a block diagram of an example computing device that performs view synthesis rendering according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
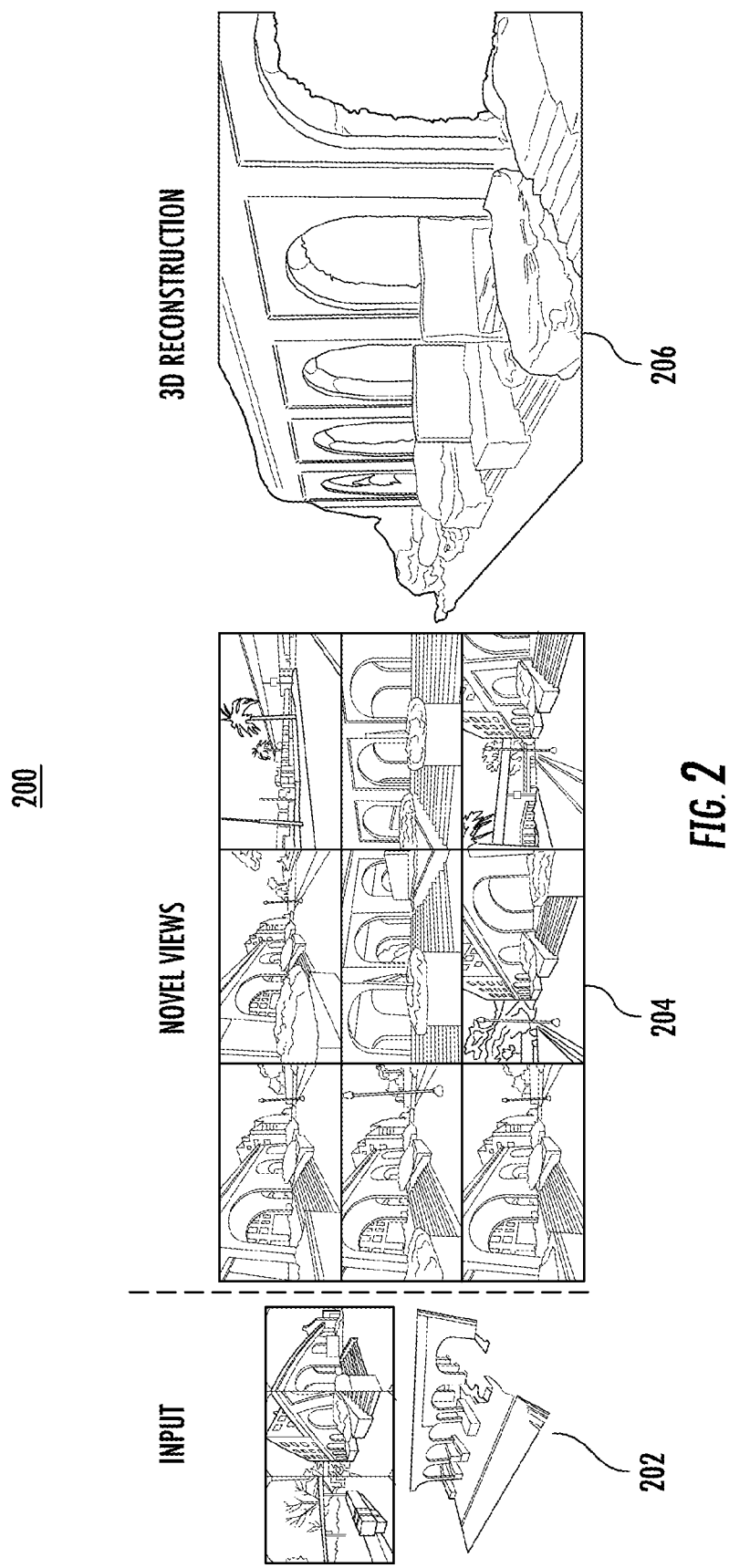
FIG. 2 depicts an illustration of example inputs and outputs according to example embodiments of the present disclosure.

FIG. 2 depicts a given set of panoramas and lidar observations 202, which can be used as input for training a view synthesis model to model an urban setting. The view synthesis model utilizes the training data 202 to estimate a neural representation that can be used for novel view synthesis 204 and accurate three-dimensional reconstruction 206.

For example, FIG. 2 can depict example inputs and outputs 200 for a view synthesis model. In some implementations, the inputs 202 for training can be obtained using sensors attached to a vehicle or sensors being carried by an individual walking a sidewalk or street. Alternatively and/or additionally, the inputs 202 can be obtained from a database that include a plurality of panoramic images and lidar data for a particular area.

The inputs 202 can be utilized to evaluate generated outputs of the view synthesis model during training. For example, the depth data can be utilized to evaluate one or more lidar loss terms, while the plurality of images can be utilized to evaluate one or more photometric-based loss terms. The machine-learned view synthesis model can then generate novel view synthesis outputs 204 and/or three-dimensional reconstruction outputs 206 based on the learned representation.

Figure 3:
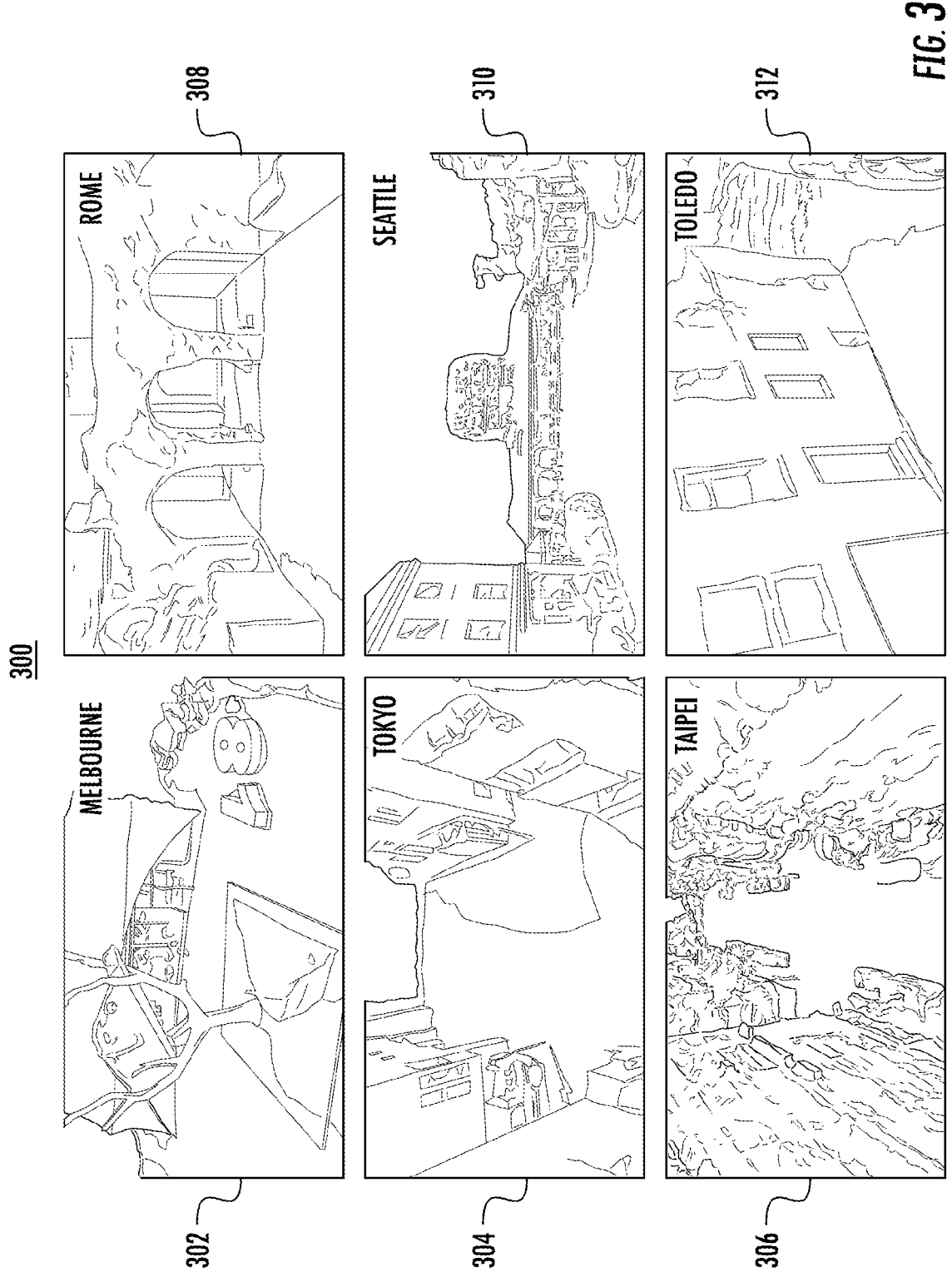
FIG. 3 depicts an illustration of example mesh outputs according to example embodiments of the present disclosure.

FIG. 3 depicts example illustrations of example extracted meshes 300 for several large scale urban scenes. In particular, extracted meshes for Melbourne 302, Tokyo 304, Taipei 306, Rome 308, Seattle 310, and Toledo 312 are depicted in FIG. 3. The extracted meshes 300 can be provided to a user as a three-dimensional reconstruction. Alternatively and/or additionally, the extracted meshes 300 can be utilized to generate view synthesis outputs and/or more detailed three-dimensional reconstruction outputs. As depicted in the Melbourne example 302, the systems and methods can learn representations for building structures and vegetation alike. The Tokyo 304 and Taipei 306 examples can convey the rendering of cars, roads, and street signs among tall buildings. Moreover, the Rome 308 and Seattle 310 examples can depict the extracted meshes for plazas, markets, and walkways. The Toledo example 312 depicts an alley made-up of multiple buildings and walls with differing doors and windows throughout the structures.

Figure 4:
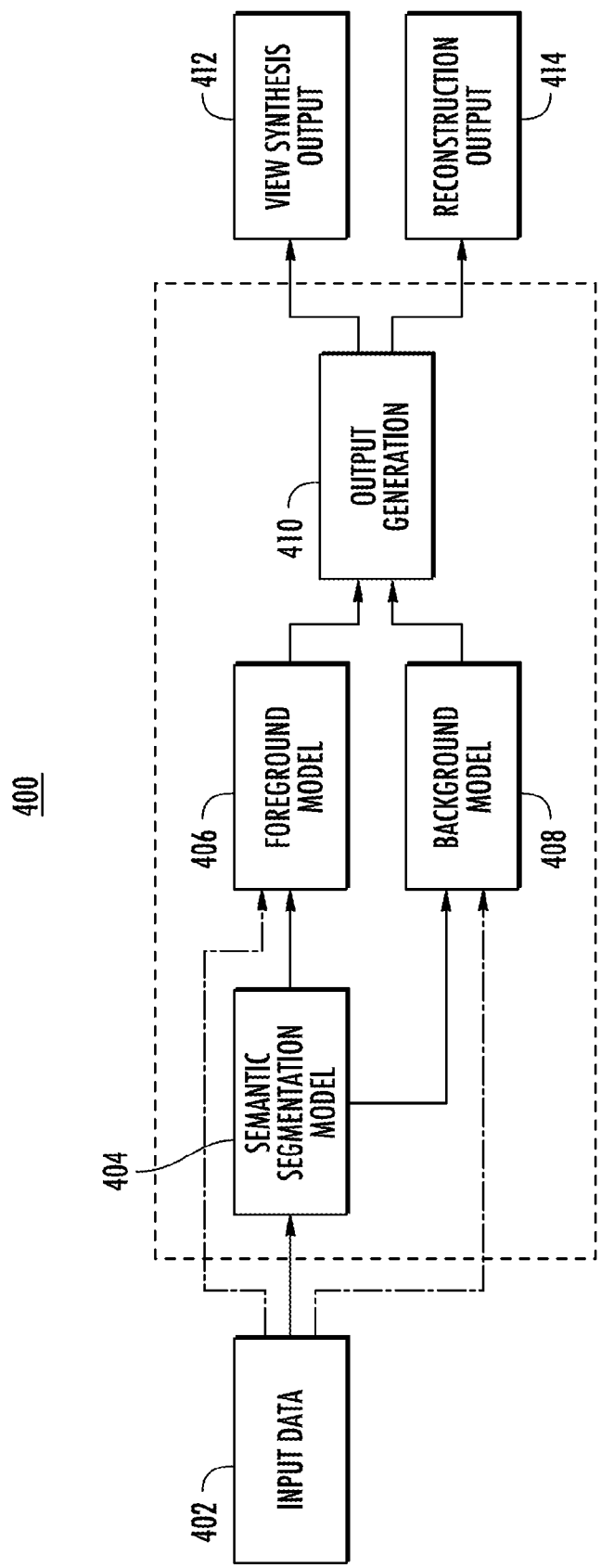
FIG. 4 depicts a block diagram of an example view synthesis model according to example embodiments of the present disclosure.

FIG. 4 depicts a block diagram of an example view synthesis model 400 according to example embodiments of the present disclosure. In some implementations, the view synthesis model 400 is trained to receive a set of input data 402 descriptive of an input position and/or a view direction and, as a result of receipt of the input data 402, provide output data 412 or 414 that can include a view synthesis output 412 (e.g., a novel view synthesis) or reconstruction output 414 (e.g., a three-dimensional reconstruction). Thus, in some implementations, the view synthesis model 400 can include a foreground model 406 that is operable to model and/or render the foreground of an environment and a background model 408 that is operable to model and/or render the background of an environment.

In some implementations, the view synthesis model 400 can include, or work in series with, a pre-trained semantic segmentation model 404. For example, during the training of the view synthesis model 400, the semantic segmentation model 404 can perform two functions. First, the semantic segmentation model 404 can process the training images to remove unwanted occlusions (e.g., moving objects such as walking humans, flying birds, and/or driving cars). Second, the semantic segmentation model 404 can find the pixels that correspond to the sky or another undetermined distance feature. The pixels that correspond to the sky or other undetermined distance feature can be modeled with a separate network than the remainder of the scene being rendered.

The systems and methods can obtain input data 402 (e.g., a three-dimensional position and a two-dimensional view direction) to be input into the view synthesis model 400. In some implementations, the input data 402 can be processed by the semantic segmentation model 404 to determine which portions of the view synthesis or three-dimensional reconstruction will be performed by which model. For example, the semantic segmentation model 404 can output segmentation outputs to be provided to the foreground model 406 and the background model 408 to instruct the models which portions of the rendering each model will be rendering. Alternatively and/or additionally, the input data 402 may be directly processed by the foreground model 406 and the background model 408.

The foreground model 406 can generate a foreground output descriptive of predicted color values and predicted density values for the pixels corresponding to determined depths. Additionally and/or alternatively, the background model 408 can generate a background output descriptive of predicted color values and predicted density values for the pixels corresponding to the sky or other undetermined depths. The foreground output and the background output can be concatenated to generate a model output. Alternatively and/or additionally, the foreground output and the background output can be processed with an output generation block 410 to generate a view synthesis output 412 and/or a reconstruction output 414.

Figure 5:
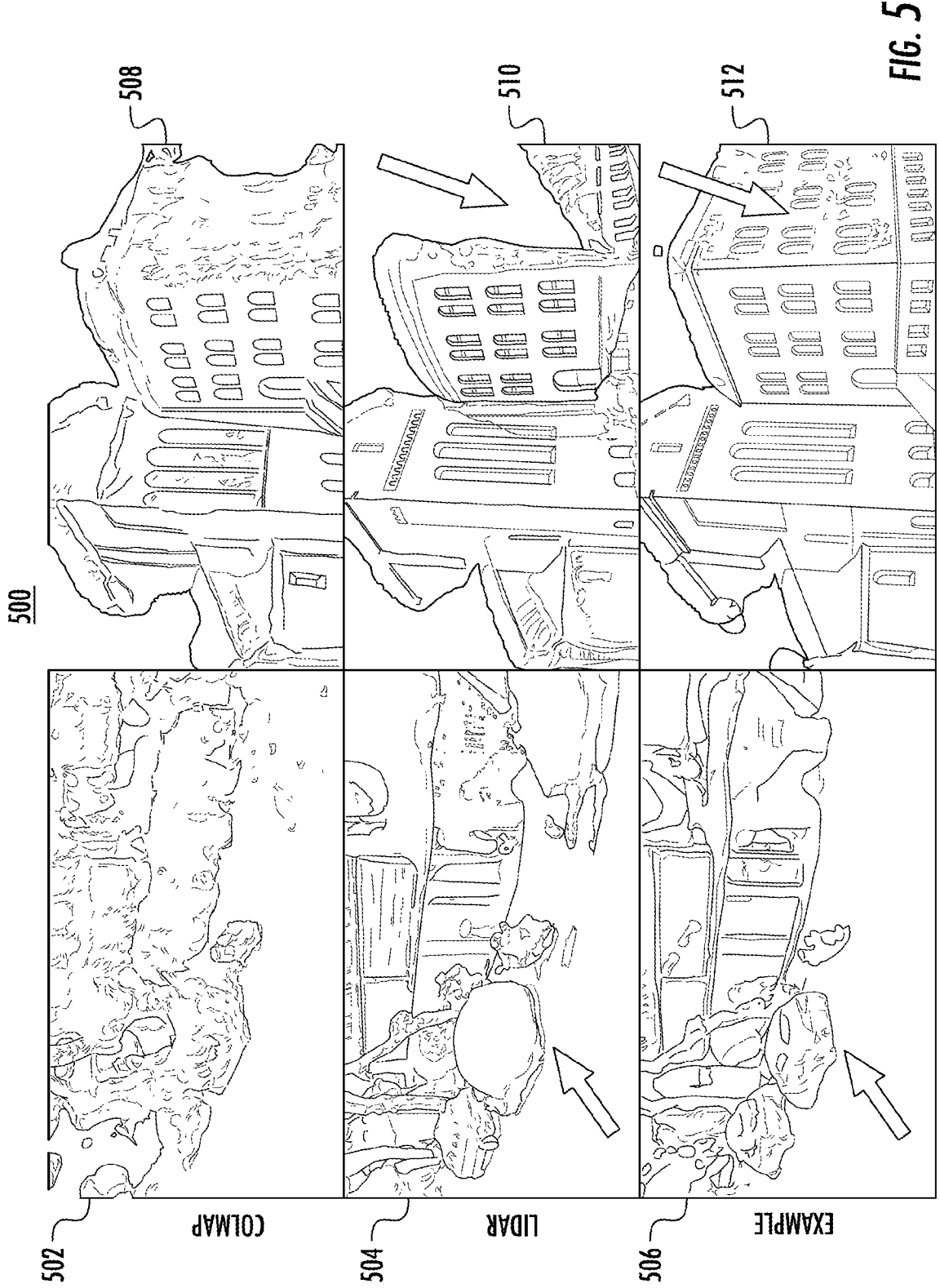
FIG. 5 depicts an illustration of example reconstruction outputs according to example embodiments of the present disclosure.

FIG. 5 depicts example illustrations of example surface reconstructions 500. For example, FIG. 5 can show the surface reconstruction returned by different approaches. The example method can be able to provide dense and accurate depth estimates, which in turn allow detailed mesh reconstructions.

In particular, FIG. 5 can convey the improved performance of an example system as disclosed herein when compared to alternatives. For example, The COLMAP meshes 502 & 508 estimated by running MVS using camera parameters provided with the dataset can provide rough estimates of surfaces with a large number of artifacts. In contrast, the lidar based meshes 504 & 510 can include smoother renderings but also fail to accurately reconstruct certain structures. However, the example system meshes 506 & 512 can include more accurate surface reconstruction.

Figure 9:
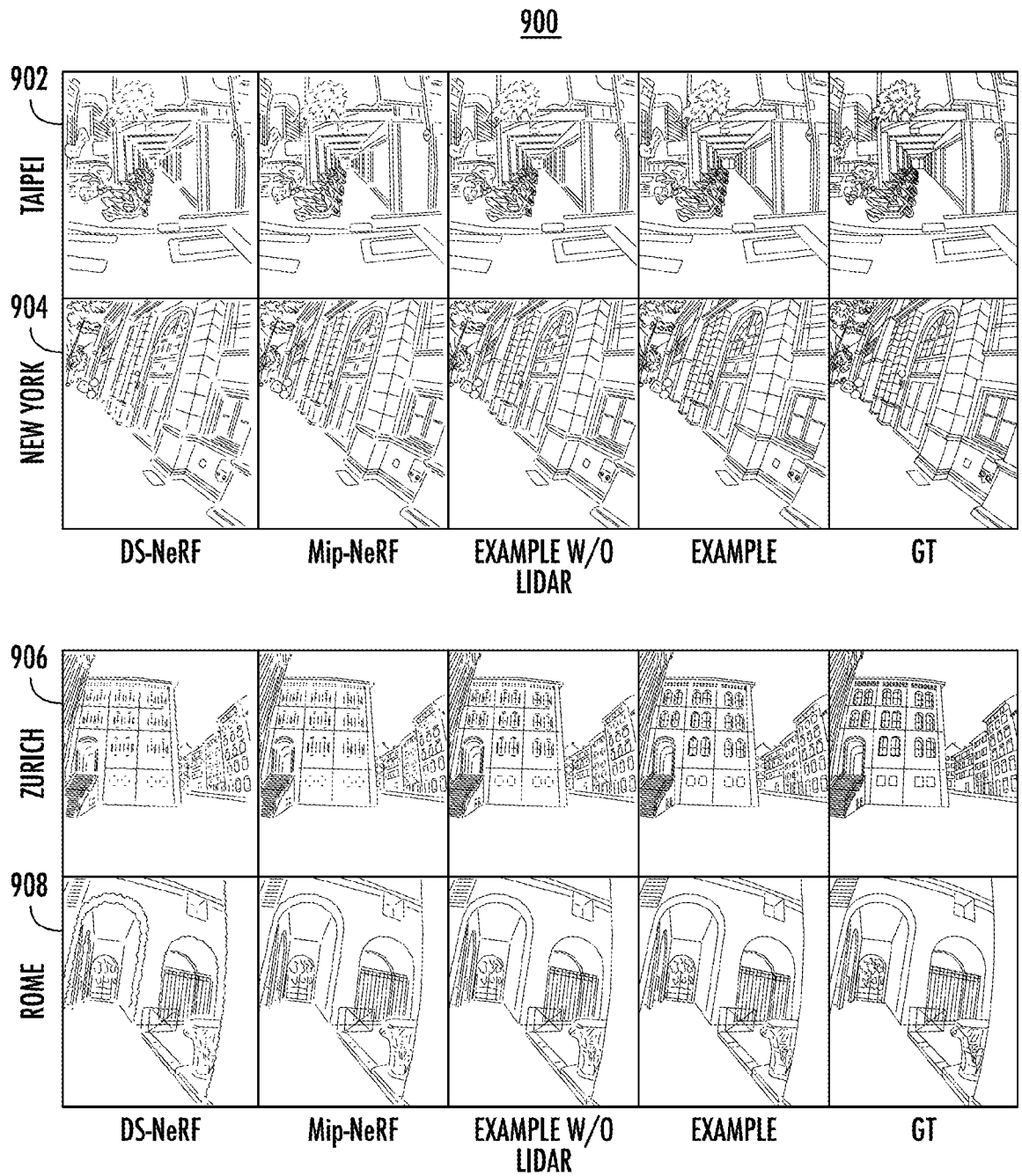
FIG. 9 depicts an illustration of example view synthesis outputs according to example embodiments of the present disclosure.

FIG. 9 depicts example view synthesis renderings 900 for varying models and techniques. In particular, FIG. 9 can provide a visualization of the output of an example model against the ground truth and different methods. The example model can be able to generate more accurate renderings that do not suffer from exposure artifacts and floating elements.

The example training datasets and respective view renderings depicted include Taipei 902, New York 904, Zurich 906, and Rome 908. In addition to the ground truth and the example model, FIG. 9 includes renderings from a DS-NeRF model, a Mip-NeRF model, and an example model not using lidar data. As conveyed by FIG. 9, the example method can generate smoother and more accurate view renderings when compared to other models.

Figure 10:
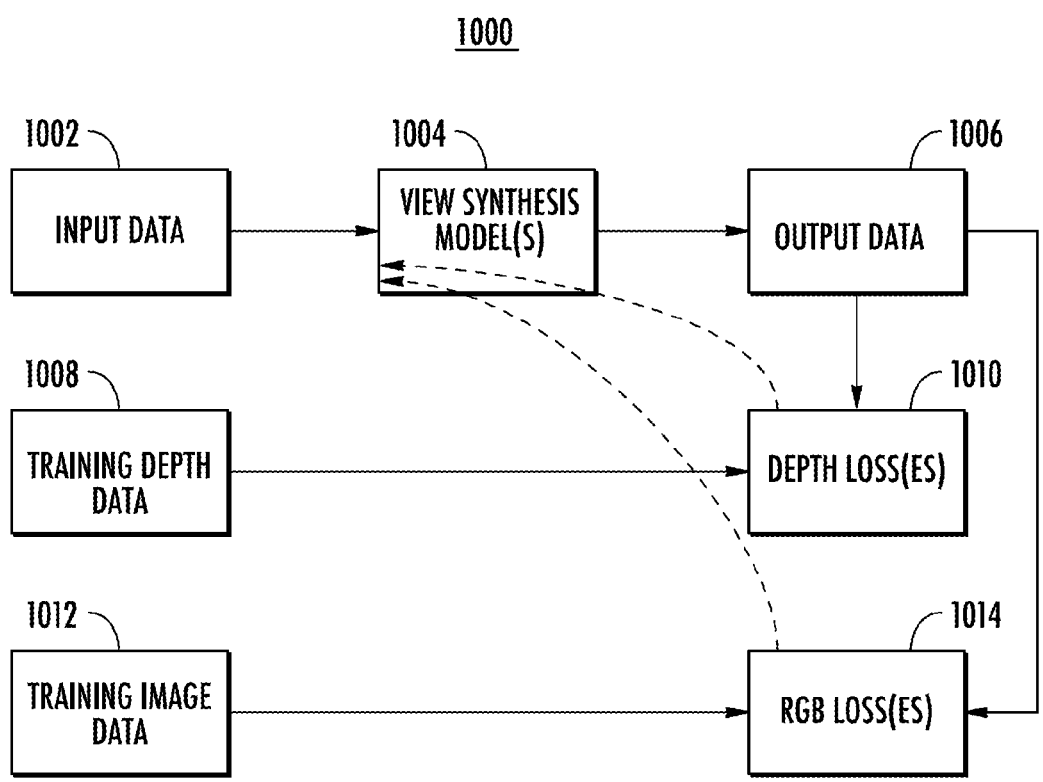
FIG. 10 depicts a block diagram of an example view synthesis model training system according to example embodiments of the present disclosure.

FIG. 10 depicts a block diagram of an example view synthesis model 1004 being trained 1000 according to example embodiments of the present disclosure. The view synthesis model 1004 is similar to the view synthesis model 400 of FIG. 4 except that the view synthesis model 1000 is being trained based on two or more losses.

The training system 1000 can include obtaining input data 1002 (e.g., a position and/or a view direction). The input data 1002 can be processed by the view synthesis model 1004 to generate output data 1006 (e.g., a view synthesis output or a three-dimensional reconstruction). The output data 1006 can be compared against training depth data 1008 to evaluate one or more depth loss terms 1010. Additionally and/or alternatively, the output data 1006 can be compared against training image data 1012 to evaluate one or more RGB loss terms 1014. In some implementations, a gradient descent for each loss term may be backpropagated to the view synthesis model 1004 in order to adjust one or more parameters of the view synthesis model 1004. Alternatively and/or additionally, the different loss terms can contribute to a gradient descent that is backpropagated to the view synthesis model 1004 to train the model for accurate view synthesis and three-dimensional reconstruction.

Example Methods

Figure 6:
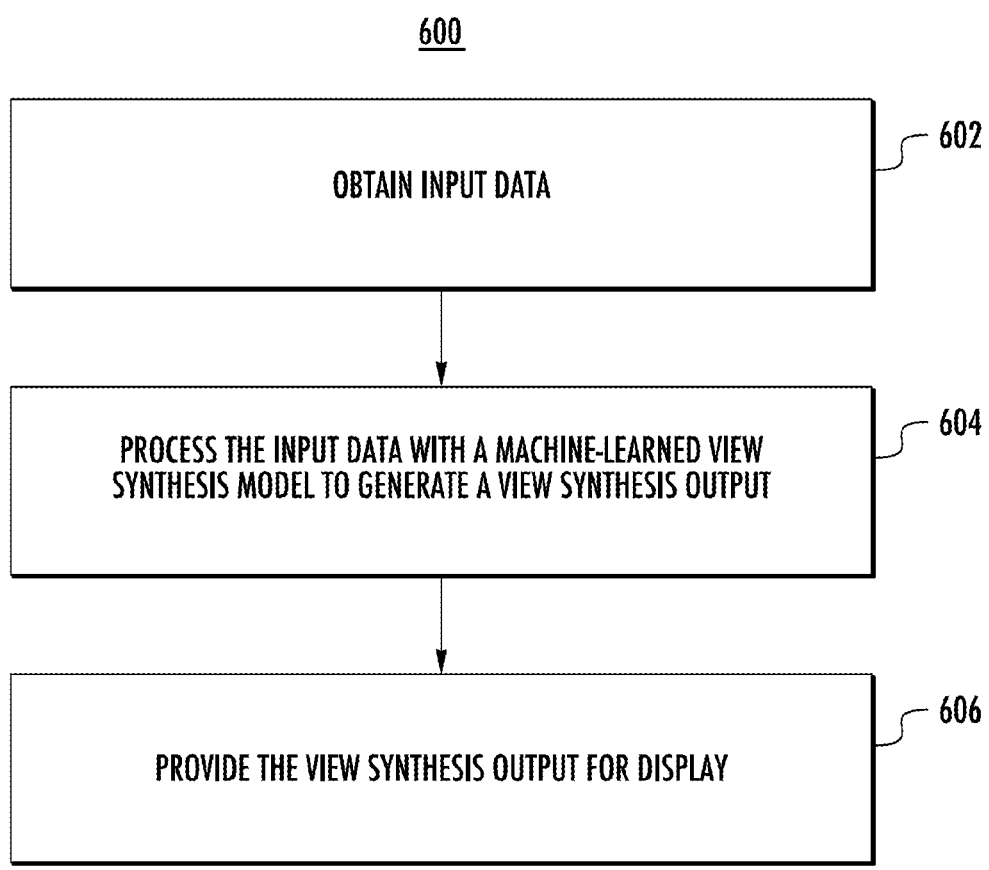
FIG. 6 depicts a flow chart diagram of an example method to perform view synthesis rendering according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain input data. The input data can be descriptive of a three-dimensional position and a two-dimensional view direction. The three-dimensional position can be associated with a location in an environment. In some implementations, the environment can include one or more structures. The one or more structures can include buildings, bridges, roads, light posts, barriers, mailboxes, etc. In some implementations, the environment can include trees, bushes, grass, other plants, dirt, rocks, boulders, etc. The environment can include an outdoor urban environment associated with a city.

At 604, the computing system can process the input data with a machine-learned view synthesis model to generate a view synthesis output. In some implementations, the machine-learned view synthesis model can be trained with a plurality of panoramic images and depth data (e.g., lidar data). The plurality of panoramic images can be descriptive of an environment. The plurality of panoramic images can be captured by one or more cameras. In some implementations, the one or more cameras can include fisheye lenses. Additionally and/or alternatively, the depth data can be obtained via radar, a light detection and ranging (lidar) sensor, a range finder, etc.

At 606, the computing system can provide the view synthesis output for display. The view synthesis output can include a novel view synthesis that differs from the plurality of panoramic images. In some implementations, the view synthesis output can include a novel view synthesis of the environment. The view synthesis output can be descriptive of at least a portion of the environment. In some implementations, the environment can include an urban outdoor environment.

Figure 7:
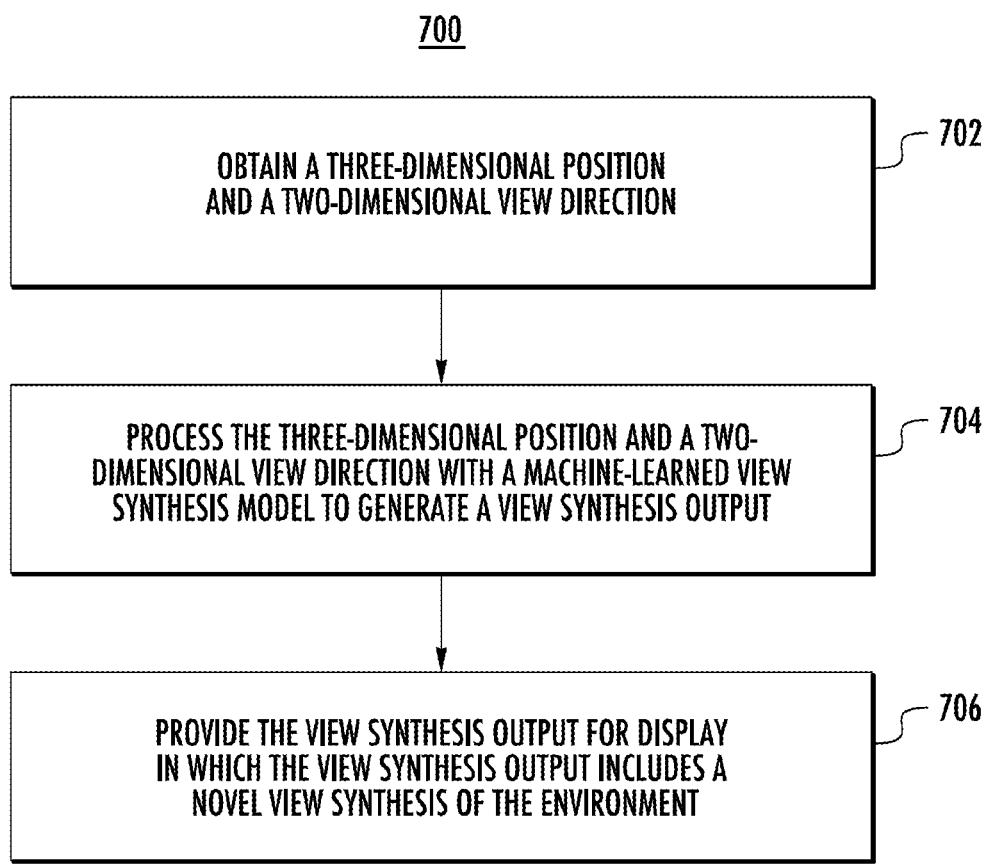
FIG. 7 depicts a flow chart diagram of an example method to perform view synthesis output generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a three-dimensional position and a two-dimensional view direction. The three-dimensional position and the two-dimensional view direction can be associated with a location and direction in an environment. In some implementations, the environment can include an outdoor urban environment including buildings, streets, and vegetation.

At 704, the computing system can process the three-dimensional position and a two-dimensional view direction with a machine-learned view synthesis model to generate a view synthesis output. The machine-learned view synthesis model can include a neural radiance field model (e.g., a Mip-NERF model). The machine-learned view synthesis model can be trained on a plurality of images of the environment along with depth data descriptive of depths in the environment. The depth data can include lidar data obtained at the same, or similar, time to the capturing of the plurality of images.

At 706, the computing system can provide the view synthesis output for display in which the view synthesis output includes a novel view synthesis of the environment. Alternatively and/or additionally, the machine-learned view synthesis model may generate a three-dimensional reconstruction output that can include a geometry aware representation (e.g., a mesh representation).

Figure 8:
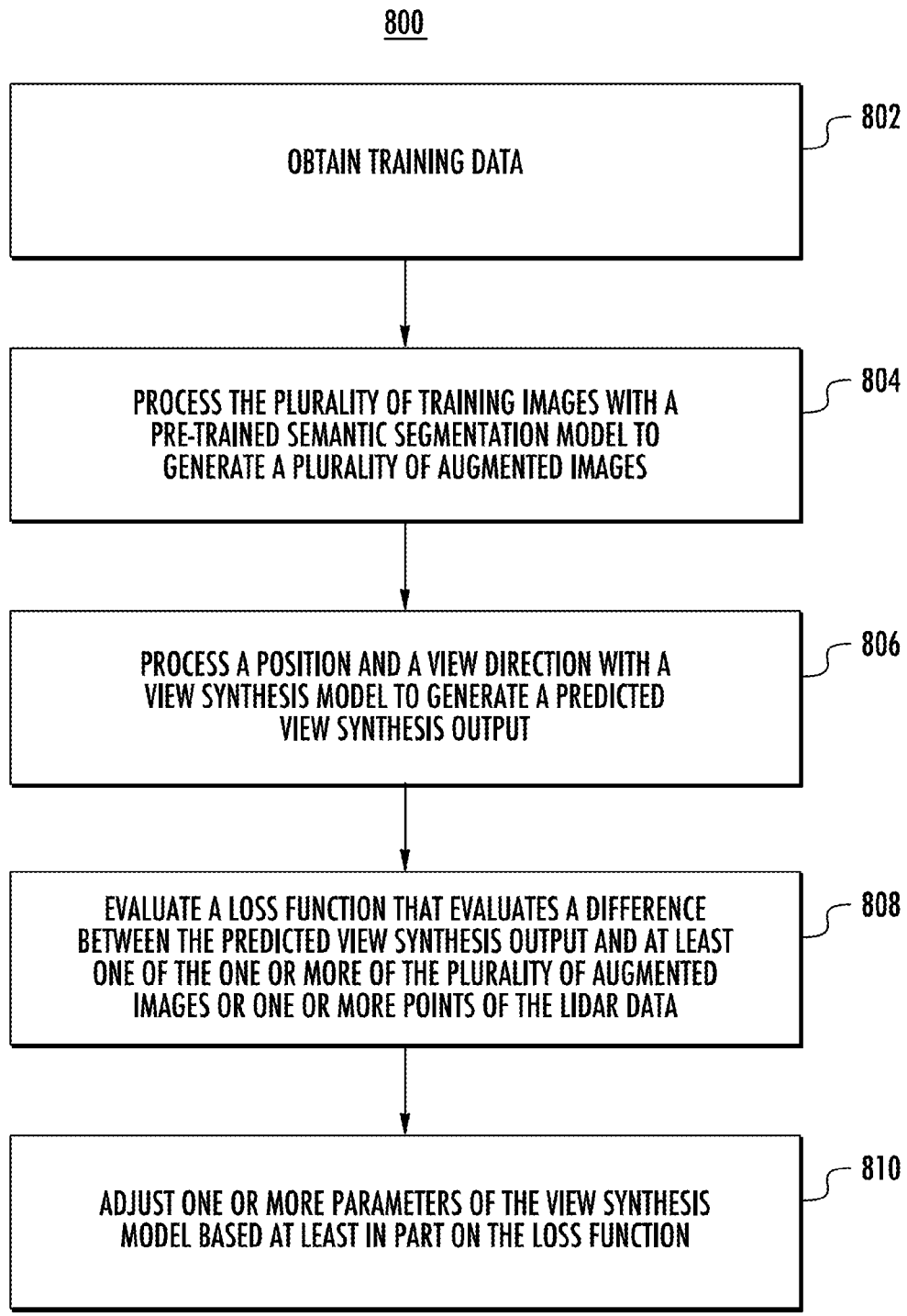
FIG. 8 depicts a flow chart diagram of an example method to perform view synthesis model training according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain training data. The training data can include a plurality of training positions, a plurality of training view directions, a plurality of training images, and/or depth data (e.g., lidar data). The plurality of training images can include a plurality of panoramic images. The plurality of panoramic images can be descriptive of street view image data collected for street view mapping purposes. The depth data can be similarly obtained from a database associated with a mapping application. The depth data can include lidar data generated by a light detection and ranging (lidar) sensor. The plurality of training images and the depth data may have been generated at similar times via sensors attached to a vehicle or other mobile object (e.g., a person carrying a camera rig with a lidar sensor placed on a backpack while walking through a city).

At 804, the computing system can process the plurality of training images with a pre-trained semantic segmentation model to generate a plurality of augmented images. The augmented images can be descriptive of the environment with occlusions removed. The pre-trained semantic segmentation model can be trained to remove occlusions from images (e.g., people, moving objects, or other objects that do not contribute to the environment in a permanent to a semi-permanent sense).

At 806, the computing system can process a position and a view direction with a view synthesis model to generate a predicted view synthesis output. In some implementations, the predicted view synthesis output can include one or more predicted color values (e.g., a probability value associated with the likelihood a certain position in a rendering should be a particular color) and one or more predicted opacity values (e.g., a probability value associated with the density of occupancy at given positions in a rendering).

At 808, the computing system can evaluate a loss function that evaluates a difference between the predicted view synthesis output and at least one of the one or more of the plurality of augmented images or one or more points of the lidar data. In some implementations, the loss function can include a photometric-based loss (e.g., a red-green-blue loss) that evaluates a difference between the predicted view synthesis output and one or more of the plurality of augmented images. Additionally and/or alternatively, the loss function can include a lidar loss that evaluates a difference between the predicted view synthesis output and one or more points of the lidar data.

In some implementations, the loss function can include a penalization term for non-zero density values outside of a determined high density area associated with a surface. The loss function can include a penalization term for non-zero density values associated with a ray directed towards a determined sky area.

At 810, the computing system can adjust one or more parameters of the view synthesis model based at least in part on the loss function. In some implementations, the loss function can evaluate the predicted view synthesis output based at least in part on one or more expected depth values or a determined line-of-sight. The one or more expected depth values can be determined based at least in part on the lidar data. The determined line-of-sight can be associated with a radiance being concentrated at a single point along a ray.

Example Implementations

The systems and methods disclosed herein can be utilized for three-dimensional reconstruction and novel view synthesis for urban environments using data image and lidar data. In some implementations, the systems and methods can extend NERF to use lidar data. Additionally and/or alternatively, the systems and methods can be trained using panoramic images in combination with the lidar data. The systems and methods can include segmenting the sky and using LIDAR data for exposure control.

Novel view synthesis systems and methods can take a set of images/geometry information depicting a scene and generate novel views of the scene from arbitrary viewpoints. The systems and methods can leverage neural radiance fields.

Three-dimensional reconstruction systems and methods can take a set of images/geometry information depicting a scene and generate dense three-dimensional reconstructions (geometry) for the underlying scene. The goal can be to estimate the scene geometry accurately.

In some implementations, the input for the systems and methods can include a set of image panoramas and lidar points from a real-world scene. The data can be commonly captured from mapping platforms such as Street View. The systems and methods can use the data to train the view synthesis model, and the output can be an accurate three-dimensional reconstruction of the scene and an implicit model that can be used to render novel views.

The systems and methods can include three parts: First, the systems and methods can use an exposure correction network to compensate for the different exposures of the cameras. Secondly, the systems and methods can use semantic segmentation to find the pixels that correspond to the sky and can model the color of these pixels with a separate network. Finally, the systems and methods can use a combination of RGB and lidar losses for training a radiance field that is geometry aware.

In some implementations, the systems and methods can perform three-dimensional reconstruction and novel view synthesis from data captured by scanning platforms commonly deployed for world mapping in urban outdoor environments (e.g., Street View). Given a sequence of posed RGB images and lidar sweeps acquired by cameras and scanners moving through an outdoor scene, the systems and methods can produce a model from which three-dimensional surfaces can be extracted and novel RGB images can be synthesized. The systems and methods can extend Neural Radiance Fields (NERF), which can be demonstrated to synthesize realistic novel images for small scenes in controlled settings, with new methods for leveraging asynchronously captured lidar data, for addressing exposure variation between captured images, and for leveraging predicted image segmentations to supervise densities on rays pointing at the sky. Each of the three extensions can provide significant performance improvements in experiments on Street View data. The system can produce state-of-the-art three-dimensional surface reconstructions and can synthesize higher quality novel views in comparison to both traditional methods (e.g., COLMAP) and recent neural representations (e.g., Mip-NeRF).

The systems and methods disclosed herein can utilize neural scene representations for world mapping, with the goal of performing three-dimensional reconstruction and novel view synthesis from data commonly captured by mapping platforms such as Street View. The setting can feature large outdoor scenes, with many buildings and other objects and natural illumination from the sun. The systems and methods can focus on street-level mapping: a person carrying a camera rig with a lidar sensor placed on a backpack walking through a city. The camera can capture panoramas of the street scene while the lidar sensor reconstructs a three-dimensional point cloud.

Street-level mapping can be challenging for neural representations, as the area of interest covers a large area, usually hundreds of square meters. Moreover, the scenes can include a large variety of objects, both in terms of geometry and appearance (e.g., buildings, cars, signs, trees, vegetation). The camera locations can be biased towards walking patterns (e.g., walking a straight line) without focusing on any particular part of the scene. The bias can result in parts of the scene being observed by only a small number of cameras, in contrast to other datasets which can capture scenes uniformly with a large number of cameras. Furthermore, the sky can be visible in most street scenes, which can introduce an infinitely distant element that behaves differently than the solid structures near the cameras. The images can typically have highly varying exposures as the cameras use auto-exposure, and the illumination brightness may vary depending on the sun's visibility and position. Combined with auto white balance, the results can result in the same structure having different colors when observed from different cameras. Finally, the lidar points can have lower resolution in distant parts of the scene and can be even completely absent in some parts of the scene (e.g., for shiny or transparent surfaces).

The systems and methods can extend a NeRF model in three ways to tailor the model to the unique features of the Street View setting and to tackle the challenges above. First, the system can incorporate lidar information in addition to RGB signals. By carefully fusing these two modalities, the system can compensate for the sparsity of viewpoints in such large scale and complex scenes. In some implementations, the system can introduce a series of lidar-based losses that allow accurate surface estimation both for solid structures like buildings and for volumetric formations such as trees/vegetation. Second, the system can automatically segment sky pixels and can define a separate dome-like structure to provide a well-defined supervision signal for camera rays pointing at the sky. Third, the model can automatically compensate for varying exposure by estimating an affine color transformation for each camera.

During experiments with real world data from Street View, the experiments can show that these three NeRF extensions significantly improve over the state-of-the-art both in the quality of synthesized novel views (+19% PSNR) and three-dimensional surface reconstructions (+0.35 F-score).

Neural radiance fields can fit a coordinate-based neural network with parameters $\theta$ to describe a volumetric scene from a set of posed images $\{I_i\}_{i=1}^N$; i.e., with known intrinsic and extrinsic calibration. To render an image, NeRF can use ray marching to sample the volumetric radiance field and can composite the sampled density and color to render the incoming radiance of a particular ray. Additionally and/or alternatively, NERF can supervise the training of $\theta$ by an L2 photometric reconstruction loss:

$$\mathcal{L}_{rgb}(\theta) = \Sigma_i \mathbb{E}_{r \sim I_i}[\|C(r) - C_i^{gt}(r)\|_2^2], \quad (1)$$

where $C_i^{gt}(r)$ can be the ground truth color of ray r passing through a pixel in image i, and the color C(r) can be computed by integrating the weighted volumetric radiance within the ray's near and far bounds $t_n$ and $t_f$:

$$C(r) = \int_{t_n}^{t_f} w(t) \cdot c(t) dt, \quad (2)$$

{c(t): radiance and r(t)=o+td can represent a ray with camera origin o oriented as d, with volume rendering integration weights:

$$w(t) = \exp\left(-\int_{t_n}^{t} \sigma(s) ds\right) \cdot \sigma(t), \quad (3)$$

$$\begin{cases} \exp\left(-\int_{t_n}^{t} \sigma(s) ds\right): \text{visibility of } r(t) \text{ from } o \\ \sigma(t): \text{density at } r(t) \end{cases}$$

while the intermediate features z(t), the volumetric density $\sigma(t)$ and view-dependent radiance fields c(t) can be stored within the parameters $\theta$ of fully connected neural networks:

$$z(t) = z(r(t); \theta): \mathbb{R}^3 \to \mathbb{R}^z, \quad (4)$$

$$\sigma(t) = \sigma(z(t); \theta): \mathbb{R}^z \to \mathbb{R}^+, \quad (5)$$

$$c(t) = c(z(t), d; \theta): \mathbb{R}^z \times \mathbb{R}^3 \to \mathbb{R}^3. \quad (6)$$

As the scenes can be observed at different distances, the systems and methods can use the integrated positional encoding for three-dimensional points r(t) and the original positional encoding for the viewing direction d.

The systems and methods disclosed herein can reconstruct three-dimensional surfaces and synthesize novel views of urban spaces from data commonly collected for autonomous driving and world mapping applications. The systems and methods disclosed herein can leverage a variety of different datasets from a variety of different databases. The following includes several references to particular datasets; however, other datasets may be utilized to train and/or test the view synthesis models. For example, the experiments on the systems and methods can include experiments on Trekker data from Street View.

Street View data can be captured for large parts of the world, and thus can provide opportunities for visualization and geometry analysis applications at scale. However, Street View can differ from other three-dimensional scene reconstruction datasets such as Phototourism in several crucial ways. First, the number of images can be captured for a particular scene, which can be significantly smaller than those found for popular landmarks. The processing can result in limited diversity of viewpoints. Second, the panoramic captures can be often accompanied by lidar sensors which provide accurate, but sparse, depth information.

Street view imagery can be collected by multiple fisheye cameras attached to a trekker capturing rig. Each camera can be calibrated with estimated intrinsic parameters and poses relative to the trekker. In some implementations, images can be collected from each camera at approximately 2 Hz as the trekker moves through the world. Images can be posed automatically within a global coordinate system using structure-from-motion and GPS information, allowing the system to assemble camera rays with origin o and direction d corresponding to each pixel.

Real world urban scenes may have moving objects whose positions change as images are captured overtime (pedestrians, cars, bicyclists, etc). If unaddressed, these objects can result in trained NeRFs that produce ghosting and blurring. Because dynamics can be often tied to semantics, the system can run a pre-trained semantic segmentation model on every image, and can then mask pixels of people, which can be the most prominent moving category.

In addition to imaging sensors, the trekker can contain time-of-flight VLP16 lidar sensors, which actively emit light to measure distances to surfaces. Unlike the imaging data which represents dense samples of incoming light, the lidar data can be a swept sequence of timestamped three-dimensional line segments represented by an origin and termination position. A single lidar segment can indicate that during the timestamp, the space traversed by an emitted ray may not intersect an opaque surface. The system can make a simplifying assumption that most surfaces detected by lidar are stationary like buildings and roads, such that the system can ignore the timestamp information and can assume that empty space is empty throughout the entire capture. The assumptions can allow the system to model lidar rays similar to camera rays, with origin $o_\ell$, direction $d_\ell$, and termination distances $z_\ell$.

The systems and methods disclosed herein can define an Urban Radiance Field (URF) with scene-level neural network parameters as well as per-image exposure parameters $\{\beta_i\}$. Given the image and lidar data for a scene, the system can optimize a URF by minimizing the following loss:

$$\operatorname*{argmin}_{\theta,\{\beta_i\}} \mathcal{L}_{rgb}(\theta, \{\beta_i\}) + \mathcal{L}_{seg}(\theta) + \mathcal{L}_{depth}(\theta) + \mathcal{L}_{sight}(\theta).$$

In some implementations, the loss function can include one or more photometric-based losses. The photometric loss term can be similar to the NeRF equation (1), but the system can also depend on estimated per-image exposure parameters $\{\beta_i\}$:

$$\mathcal{L}_{rgb}(\theta,\{\beta_i\})=\Sigma_i \mathbb{E}_{r \sim I_i}[\|C(r;\beta_i)-C_i^{gt}(r)\|_2^2]. \quad (7)$$

Alternatively and/or additionally, the systems and methods can modify the volume rendering equation in two ways:

$$C(r;\beta_i) = \int_{t_n}^{t_f} w(t) \cdot \Gamma(\beta_i) \cdot c(t)dt + c_{sky}(d), \quad (8)$$

$$\begin{cases} \Gamma(\beta_i): \text{exposure compensation} \\ c_{sky}(d): \text{sky modeling} \end{cases}$$

In some implementations, the systems and methods can include exposure compensation. Images acquired by mapping systems can be captured with auto white balance and auto exposure which complicates the computation of $\mathcal{L}_{rgb}$ in (1). The issue can be addressed using latent codes, learned separately for each image, that map image-independent scene radiance to an image-dependent radiance. One shortcoming with such an approach can be that modeling exposure variations with a per-image latent code can be overparameterized as the system can allow the latent codes to compensate for non-exposure related errors. Instead, in (8) the system can perform an affine mapping of the radiance predicted by the shared network where the affine transformation is a 3×3 matrix decoded from the per-image latent code $\beta_i \in \mathbb{R}^B$:

$$\Gamma(\beta_i)=\Gamma(\beta_i;\theta): \mathbb{R}^B \to \mathbb{R}^{3\times3}. \quad (9)$$

The mapping can model white balance and exposure variations with a more restrictive function, and thus can be less likely to cause unwanted entanglement when the scene radiance parameters θ and the exposure mappings β are optimized jointly.

Additionally and/or alternatively, the systems and methods disclosed herein can include sky modeling. Outdoor scenes can include sky regions where rays never intersect any opaque surfaces, and thus the NeRF model can obtain a weak supervisory signal in those regions. To address the sky issue, the view synthesis model can therefore include a spherical radiance (environment) map represented as a coordinate-based neural network, $$c_{sky}(d)=c_{sky}(d;\theta): \mathbb{R}^3 \to \mathbb{R}^3, \quad (10)$$

to provide a direction-dependent background color for those regions. To modulate which rays utilize the environment map, the system can run a pre-trained semantic segmentation model for each image to detect pixels likely to be sky: $S_i=S(I_i)$, where $S_i(r)=1$ if the ray r goes through a sky pixel in image i. The system can then use the sky mask to define an additional loss that encourages at all point samples along rays through sky pixels to have zero density:

$$\mathcal{L}_{seg}(\theta)=\mathbb{E}_{r \sim I_i}[S_i(r)\int_{t_n}^{t_f} w(t)^2 dt]. \quad (11)$$

In some implementations, whenever $S_i(r)=1$, the system may force the $c_{sky}$ to explain the pixel for ray r in (8).

In addition to or alternatively to the photometric-based losses, the loss function can include one or more lidar losses. Since lidar data can be available in the training data, the system may use the lidar data to supervise training of the model. The system can be given a collection of L lidar samples $D=\{O_{\ell=1}^L\}$, each corresponding to a ray $r(z)= o_\ell + zd_\ell$, and the associated three-dimensional measurement $p_\ell=r(z_\ell)$. In some implementations, the systems and methods can break the losses into two different types: (1) supervising the expected depth value, and (2) supervising the free space along the line-of-sight from the lidar sensor to the observed position.

For example, the loss function can include a loss term for expected depth. The system can start by supervising the expected depth from a volumetric rendering process (i.e., optical depth) to match the depth of the lidar measurement:

$$\mathcal{L}_{depth}(\theta)=\mathbb{E}_{r \sim D}[\int_{t_n}^{t_f}(w(t)\cdot t-z)^2 dt], \quad (12)$$

{w(t)·t: optical depth.

Additionally and/or alternatively, the loss function can include a loss term for line-of-sight priors. For points that are observed by a lidar sensor, a reasonable assumption can be that a measured point p corresponds to a location on a non-transparent surface, and that atmospheric media may not contribute to the color measured with respect to a lidar ray $r_\ell=r(z_\ell)$. Hence, the system can expect that the radiance may be concentrated at a single point along the ray, and therefore that a single point can be responsible for the observed color. In other words, with reference to (2):

$$c(r_\ell)=c(r_\ell) \text{ if } w(t)=\delta(t), \quad (13)$$

where $\delta(\cdot)$ is the continuous Dirac function. The system can convert this constraint via the penalty method into a loss:

$$\mathcal{L}_{sight}(\theta)=\mathbb{E}_{r\sim D}[\int_{t_n}^{t_f}(w(t)-\delta(z))^2 dt], \quad (14)$$

and to make this numerically tractable, the system can replace the Dirac with a kernel $K_\epsilon(x)$ that integrates to one (i.e., a distribution) that has a bounded domain parameterized by $\epsilon$. The system can choose $$K_\epsilon(x) = \mathcal{N}\left(0, \left(\frac{\epsilon}{3}\right)^2\right),$$

with $\mathcal{N}$ being a truncated Gaussian, and can then split the ray integral into three intervals with three corresponding losses:

$$\mathcal{L}_{sight}(\theta) = \mathcal{L}_{empty}(\theta) + \mathcal{L}_{near}(\theta) + \mathcal{L}_{dist}(\theta), \quad (15)$$

$$\begin{cases} \mathcal{L}_{empty}(\theta): t \in [t_n, z-\epsilon] \\ \mathcal{L}_{near}(\theta): t \in [z-\epsilon, z+\epsilon] \\ \mathcal{L}_{dist}(\theta): t \in [z+\epsilon, t_f] \end{cases}$$

The second term in the breakdown above can be:

$$\mathcal{L}_{near}(\theta)=\mathbb{E}_{r\sim D}[\int_{z-\epsilon}^{z+\epsilon}(w(t)-K_\epsilon(t-z))^2 dt], \quad (16)$$

which encourages the representation to increase volumetric density in the neighborhood of p, thereby allowing training to converge more quickly. In some implementations, as $K_\epsilon(x)$ has bounded support in $[z-\epsilon; z+\epsilon]$, the first term can be simplified to:

$$\mathcal{L}_{empty}(\theta)=\mathbb{E}_{r\sim D}[\int_{t_n}^{z-\epsilon} w(t)^2 dt], \quad (17)$$

which can require that the portion of space between the ray origin and the lidar point p (i.e., the line-of-sight) may not contain any three-dimensional surface. The line of sight information can be a key ingredient in "volume carving" techniques. The last term can have a similar form:

$$\mathcal{L}_{dist}(\theta)=\mathbb{E}_{r\sim D}[\int_{z+\epsilon}^{t_f} w(t)^2 dt]; \quad (18)$$

however, because the term's purpose can be to ensure that w(t) sums to one, and because NeRF's volume rendering equation may require that w(t) sums to no more than one, the term can be safely dropped during training. The choice of a smooth kernel $K_\epsilon(x)$ can be critical, as it guarantees continuity across the transition between losses at $z-\epsilon$. Additionally and/or alternatively, selecting a suitable value can play an important role in the reconstruction accuracy. The system can discover that employing a small $\epsilon$ hinders performance, especially in the early training phases, and note that a similar behavior has also been observed in somewhat related methods that anneal the bandwidth of importance sampling over time. In the disclosed network, the system can adopt an exponential decay strategy for $\epsilon$.

Example Experiments

To evaluate the systems and methods disclosed herein, a set of experiments were performed. The series of experiments evaluated an example view synthesis model and tested whether the systems and methods enable more accurate renderings of novel views and improve the quality of three-dimensional geometric reconstructions.

The example view synthesis model may be trained on a street view dataset. The dataset may be collected by collecting from 10 scenes from cities around the globe covering six continents. Each scene may correspond to a trekker capture of approximately 20 panoramas (each containing 7 images) and 6 million lidar points on average. Each scene can cover hundreds of square meters and can represent a different urban environment. For the quantitative analysis, the experiments can report average metrics over the scenes Taipei, Zurich, New York, Rome. The experiments can include splitting the overall dataset in two different ways in a training and a test set, giving rise to the two experimental settings.

The first setting can include held-out viewpoints. The experiment can split each scene into train and test based on the camera locations. The experimental method can randomly select 20% simultaneous image captures from our trekker rig and can use them as test views. As lidar sensors operate in a continuous fashion, the experimental method can select all lidar rays whose origins may be close to a test camera's location as the lidar test set.

The second setting can include held-out buildings. The experiment can evaluate how well the view synthesis model reconstructs entire three-dimensional surfaces for which the system does not have any lidar. To simulate the scenario, the experimental method can manually select a building and can remove all lidar rays terminating on the surface; the removed rays form the test set. The experimental method can use the remaining lidar rays and all images as the training set.

A plurality of baselines can be utilized for evaluation. For each of the baselines, the experimental method can adjust the model parameters (e.g., number of rays, samples, etc) to be comparable: NeRF (e.g., a JAX version NERF, which can operate on images only), Mip-NeRF (e.g., an extension of NeRF that can use integrated positional encoding, which can operate only on images), DS-NeRF (e.g., a method that utilizes three-dimensional keypoints from an SfM reconstruction to supervise the NeRF density), and NeRF-W (e.g., NeRF in the Wild that can handle images with different exposures using images only).

The experiments can first consider novel view synthesis by training and then rendering novel views in the Held-out Viewpoints setting (Table 1). The experiment can evaluate the rendered test views using three standard metrics: PSNR, SSIM, and LPIPS. The experiment can evaluate on the right part of the image, as the left may be used for test-time optimization of the exposure latent codes for the example method and NeRF-W.

|  | Lidar | PSNR↑ | SSIM↑ | LPIPS↓ |
| --- | --- | --- | --- | --- |
| NERF | No | 14.791 | 0.477 | 0.569 |
| NERF-W | No | 17.156 | 0.455 | 0.62 |
| Mip-NERF | No | 16.987 | 0.516 | 0.458 |
| DS-NERF | Yes | 15.178 | 0.5 | 0.537 |
| Example w/o Lidar | No | 19.638 | 0.541 | 0.447 |
| Example | Yes | 20.421 | 0.563 | 0.409 |

Table 1 can be descriptive of novel view synthesis results. The experiment can report standard image rendering metrics on test views of selected scenes.

Starting from the base model Mip-NeRF, the systems and methods can achieve significant improvements by adding our exposure and sky modeling (second-last row). Additionally, including lidar information can improve the renderings even further (last row). The methods the experiments compare against may be challenged by Street View data due to its sparsity in terms of viewpoints and exposure variations between images. The example method can outperform all of them, including NeRF-W which may be designed for outdoor scenes, and DS-NeRF, which exploits lidar.

In FIG. 9, rendered results on test views can be shown from various models. Mip-NeRF may suffer from the model's inability to handle exposure variations, resulting in floating artifacts that attempt to explain the differences in exposure between training views. In some experiments, the experiments can show that example models can show significantly sharper images when using lidar due to geometrically accurate surface placements and suppression of erroneous, semi-transparent density "floaters". The improvement can be more visible in the distant areas like the arcade in Rome and the covered sidewalk in Taipei.

The experiment can include evaluation on three-dimensional reconstruction results. The experiments can evaluate the quality of the recovered three-dimensional scene structure, both in terms of depth estimates and point clouds.

The example full model can be able to use the sparse lidar supervision to reconstruct significantly finer depth detail compared to using only the dense pixel supervision. In particular, the systems and methods can reconstruct crisp depth values even for some surfaces that are difficult to capture, like cars and window frames. Note that the lidar depthmaps can be estimated using depth-aware splatting and the missing regions are due to the lidar scanning pattern. For quantitative evaluation, the system can use the set of test lidar rays' origin $o_\ell$ and direction $d_\ell$, to cast rays and ask the model to estimate the expected termination distance $\hat{z}$ by sampling its volumetric density function and accumulating its transmittance, similar to Eq. (12). The experiments can compare this model estimate to the ground truth termination distance z and report the average error in meters. The experiments can also report accuracy as the number of test rays estimated within 0:1 meters of their ground truth (Acc@0.1 m). Looking at the results in using Chamfer Distance and F-score (threshold=0.1 meters). As Table 2 shows, the example model can have the best performance across all metrics in both held-out settings. The difference can be large even over DS-NeRF, that uses lidar, indicating that both our exposure/sky modeling and the disclosed combination of losses can be important to achieve high accuracy.

In some implementations, the systems and methods can be utilized for mesh reconstruction. For example, the example view synthesis model can be used to generate dense point clouds by casting one ray for each pixel in each training camera and estimating depth for the scene. For comparison, the systems and methods can obtain a point cloud with COLMAP estimated by running MVS using the camera parameters provided with the dataset. The experiments can compare to the point cloud defined by the lidar points (the training points that the experiments feed to the example method). For each method, the systems and methods can reconstruct three-dimensional meshes using Poisson Surface Reconstruction.

FIG. 5 can show the meshes derived from our point clouds, from COLMAP and from lidar. The example method can be able to estimate accurately the underlying geometry, whereas COLMAP loses fine details and lidar produces artifacts due to limited sampling resolution. The example method can provide denser coverage than the raw lidar, since the example method can also use images. These provide higher resolution observations in some regions (e.g., the cars in the image on the left) and broader coverage (e.g., the missing region of the building on the right), as the scanning pattern of the lidar is far narrower than the image panoramas. The systems and methods disclosed herein can accurately reconstruct fine details in areas hundreds of square meters large.

As exposure compensation and sky modeling are added, the experiments can show consistent improvements in all

TABLE 2 the experiments can show that the example model outperforms all baselines on both metrics (by ~3×).

| | | Held-out Viewpoints | | | | Held-out Building | | | |
|---|---|---|---|---|---|---|---|---|---|
| | Lidar | Avg Error (m)↓ | Acc↑ | CD↓ | F↑ | Avg Error (m)↓ | Acc↑ | CD↓ | F↑ |
| NERF | No | 1.582 | 0.264 | 3.045 | 0.528 | 1.423 | 0.274 | 2.857 | 0.535 |
| NERF-W | No | 3.663 | 0.144 | 6.165 | 0.372 | 1.348 | 0.207 | 4.054 | 0.552 |
| Mip-NERF | No | 1.596 | 0.133 | 2.812 | 0.363 | 1.417 | 0.132 | 2.508 | 0.427 |
| DS-NERF | Yes | 1.502 | 0.259 | 2.571 | 0.526 | 1.367 | 0.294 | 2.72 | 0.558 |
| Example | Yes | 0.463 | 0.742 | 0.272 | 0.88 | 0.77 | 0.363 | 2.312 | 0.687 |

Table 2 can be descriptive of reconstruction evaluation results. The experiments can compare various NeRF based approaches in two experimental settings (Held-out Viewpoints, Held-out Buildings). The experiments can report two depth estimation metrics (Average Error and Accuracy) and two point cloud metrics (Chamfer Distance CD, and F-score).

The systems and methods can generate three-dimensional point clouds directly from the ray parameters and depth estimates. Given a ray origin $o_\ell$, direction $d_\ell$, and ground truth termination distance z, the corresponding three-dimensional point can be $p_\ell = o_\ell + z d_\ell$. By iterating over all the test lidar rays, the systems and methods can estimate the ground truth point cloud of the scene. The system can do the same for the estimated depth $\hat{z}$, resulting in the predicted point cloud. The experiments can compare the two clouds three-dimensional reconstruction metrics (second and third rows). When incorporating lidar, the best performing setup can be when using all proposed losses at the same time. The strongest contribution can come from the near-surface loss, as when the near-surface loss function is not activated the performance drops considerably. The empty-space loss, which may be primarily used to suppress floating semi-transparent density ("floaters"), can harm performance when used without the near-surface loss. The results can indicate that the decaying margin strategy may be a suitable way to gather the benefits of both losses.

The experiments can investigate the effect of the affine color transformation. An alternative can be to provide the exposure code $\beta_i$ directly as an input to the network, as done in NeRF-W. However, in this way the exposure code can explain arbitrary appearance elements, and not necessarily those due to exposure/white balance. The appearance can change when modifying latent codes. For an example affine model, this can translate into rendering the same structure with different color tones, while the direct approach generates visible artifacts. The results can affect three-dimensional reconstruction performance: the example affine model results in F-score of 0.47 vs 0.36 for the direct approach. The artifacts can be reduced by limiting the power of the latent codes to affect rendering (e.g., by providing $\beta_l$ to later layers of the network or reducing their dimensionality).

A benefit of having precise three-dimensional reconstruction as part of a NeRF-based model can be that the benefit can enable great flexibility in placing a virtual camera for novel view synthesis. The experiments can visualize rendered images and depth maps by the example model from camera positions substantially different from those along the trekkers acquisition path (on average 1.7 meters away from the closest training camera).

Therefore, a system for three-dimensional reconstruction and novel view synthesis can be trained from data captured by mobile scanning platforms in urban environments. The systems and methods can extend on Neural Radiance Fields with new ideas to leverage asynchronously captured lidar data, to account for differences in exposures between captured images, and to leverage predicted image segmentations to supervise the density of rays pointing towards the sky. Experimental results on Street View data can demonstrate that each of these three ideas significantly improves performance on its own, and that they combine to produce better synthesized novel views (+19% PSNR) and 3D surface reconstructions (+0.35 Fscore).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining input data, wherein the input data is descriptive of a three-dimensional position and a two-dimensional view direction;
processing the input data with a machine-learned view synthesis model to generate a view synthesis output, wherein the machine-learned view synthesis model is trained with a plurality of panoramic images and lidar data, wherein the plurality of panoramic images are descriptive of an environment, and wherein the machine-learned view synthesis model comprises a first model for determining foreground values and a second model for determining background values associated with a background in the environment with an undetermined depth, wherein the second model comprises a spherical radiance map for determining a direction-based color value for the background;
providing the view synthesis output as an output, wherein the view synthesis output comprises a novel view synthesis that differs from the plurality of panoramic images.

2. The system of claim 1, wherein the machine-learned view synthesis model comprises an exposure correction network, wherein the exposure correction network compensates for different exposures of different cameras utilized to generate the plurality of panoramic images.

3. The system of claim 1, wherein the plurality of panoramic images are obtained from a mapping platform, wherein the plurality of panoramic images comprise a plurality of street-view images.

4. The system of claim 1, wherein the machine-learned view synthesis model comprises the first model to determine foreground color values and foreground opacity values for foreground features and the second model to determine background color values and background opacity values.

5. The system of claim 1, wherein the machine-learned view synthesis model is trained to learn a three-dimensional reconstruction of the environment.

6. The system of claim 1, wherein the view synthesis output comprises a three-dimensional reconstruction output.

7. The system of claim 1, wherein the view synthesis output is descriptive of at least a portion of the environment, wherein the environment comprises an urban outdoor environment.

8. The system of claim 1, wherein the machine-learned view synthesis model comprises a neural radiance field model.

9. The system of claim 1, wherein the plurality of panoramic images are processed with a pre-trained semantic segmentation model before training the machine-learned view synthesis model.

10. The system of claim 9, wherein the pre-trained semantic segmentation model determines one or more pixels are associated with a sky in the environment and masks the one or more pixels.

11. A computer-implemented method, the method comprising:
obtaining, by a computing system comprising one or more processors, input data, wherein the input data is descriptive of a three-dimensional position and a two-dimensional view direction;
processing, by the computing system, the input data with a machine-learned view synthesis model to generate a view synthesis output, wherein the machine-learned view synthesis model is trained with a plurality of images and lidar data, wherein the plurality of images are descriptive of an environment, and wherein the machine-learned view synthesis model comprises a first model for determining foreground values and a second model for determining background values associated with a background in the environment with an undetermined depth, wherein the second model comprises a spherical radiance map for determining a direction-based color value for the background;

providing, by the computing system, the view synthesis output for display, wherein the view synthesis output comprises a novel view synthesis of the environment.

12. The method of claim 11, wherein the plurality of images comprise image data generated by one or more cameras with a fisheye lens.

13. The method of claim 11, wherein the second model is trained at least in part one or more augmented images generated with a pre-trained semantic segmentation model.

14. One or more non-transitory computer-readable media that collectively store instructions that, when executed by one or more computing devices, cause the one or more computing devices to perform operations, the operations comprising:

obtaining training data, wherein the training data comprises a plurality of training positions, a plurality of training view directions, a plurality of training images, and lidar data;

processing the plurality of training images with a pre-trained semantic segmentation model to generate a plurality of augmented images, wherein the pre-trained semantic segmentation model was trained to remove occlusions from images;

processing a position and a view direction with a view synthesis model to generate a predicted view synthesis output, wherein the predicted view synthesis output comprises one or more predicted color values and one or more predicted opacity values;

evaluating a loss function that evaluates a difference between the predicted view synthesis output and at least one of one or more of the plurality of augmented images or one or more points of the lidar data; and adjusting one or more parameters of the view synthesis model based at least in part on the loss function.

15. The one or more non-transitory computer-readable media of claim 14, wherein the loss function comprises a photometric-based loss that evaluates a difference between the predicted view synthesis output and one or more of the plurality of augmented images.

16. The one or more non-transitory computer-readable media of claim 14, wherein the loss function comprises a lidar loss that evaluates a difference between the predicted view synthesis output and one or more points of the lidar data.

17. The one or more non-transitory computer-readable media of claim 14, wherein the loss function evaluates the predicted view synthesis output based at least in part on one or more expected depth values or a determined line-of-sight;

wherein the one or more expected depth values are determined based at least in part on the lidar data; and wherein the determined line-of-sight is associated with a radiance being concentrated at a single point along a ray.

18. The one or more non-transitory computer-readable media of claim 14, wherein the loss function comprises a penalization term for non-zero density values outside of a determined high density area associated with a surface.

19. The one or more non-transitory computer-readable media of claim 14, wherein the loss function comprises a penalization term for non-zero density values associated with a ray directed towards a determined sky area.

* * * * *

UNITED STATES PATENT AND TRADEMARK OFFICE
CERTIFICATE OF CORRECTION

| | | |
|---|---|---|
| PATENT NO. | : 12,106,428 B2 | Page 1 of 1 |
| APPLICATION NO. | : 17/686683 | |
| DATED | : October 1, 2024 | |
| INVENTOR(S) | : Konstantinos Rematas et al. | |

It is certified that error appears in the above-identified patent and that said Letters Patent is hereby corrected as shown below:

On the Title Page

Correct to recite the claim of priority to Greek Patent Application Number 20220100191, filed on March 1, 2022, in the Greek Patent Office.

Signed and Sealed this
Nineteenth Day of November, 2024

*Katherine Kelly Vidal*

Katherine Kelly Vidal
*Director of the United States Patent and Trademark Office*